(12) United States Patent
Tang

(10) Patent No.: US 11,194,300 B2
(45) Date of Patent: Dec. 7, 2021

(54) METHODS, SYSTEMS AND COMPUTER PROGRAM PRODUCTS FOR MONITORING FIELD DEVICE STATES IN A PROCESS CONTROL SYSTEM

(71) Applicant: Yokogawa Electric Corporation, Tokyo (JP)

(72) Inventor: Tung Ngie Tang, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 16/705,313

(22) Filed: Dec. 6, 2019

(65) Prior Publication Data

US 2021/0173355 A1    Jun. 10, 2021

(51) Int. Cl.
*G06F 3/00* (2006.01)
*G05B 13/02* (2006.01)
*H04L 12/24* (2006.01)
*G05B 23/02* (2006.01)

(52) U.S. Cl.
CPC ........... *G05B 13/024* (2013.01); *G05B 23/02* (2013.01); *H04L 41/0866* (2013.01); *G05B 2219/25428* (2013.01); *G05B 2219/31103* (2013.01)

(58) Field of Classification Search
CPC ........ G05B 13/024; G05B 2219/31103; H04L 41/0866
See application file for complete search history.

(56) References Cited

U.S. PATENT DOCUMENTS

| | | | | |
|---|---|---|---|---|
| 2005/0240382 A1* | 10/2005 | Nakaya | ............ | G05B 19/41885 703/6 |
| 2009/0018675 A1* | 1/2009 | Sesay | ................... | G05B 19/042 700/17 |
| 2011/0288660 A1* | 11/2011 | Wojsznis | ............. | G05B 23/024 700/30 |
| 2011/0288837 A1* | 11/2011 | Blevins | .................. | G05B 17/02 703/6 |
| 2018/0109722 A1* | 4/2018 | Laroia | .................. | H04N 9/8205 |
| 2019/0368490 A1* | 12/2019 | Maishigi | ................. | F04C 25/02 |
| 2020/0166909 A1* | 5/2020 | Noone | ............. | G05B 19/41875 |

* cited by examiner

*Primary Examiner* — Richard G Keehn
(74) *Attorney, Agent, or Firm* — Sheridan Ross P.C.

(57) ABSTRACT

The invention provides methods, systems and computer program products for monitoring field device states within a process control system, and for detecting and responding to state changes associated with one or more field devices. Implementation of the invention involves, for each field device within a selected sub-set of the plurality of field devices, (i) retrieving a reference set or template set of field device parameter state data associated with the field device (ii) retrieving a set of current state data associated with each field device within the selected sub-set of the plurality of field devices, (iii) comparing the two sets of parameter state data for each field device within the selected sub-set of the plurality of field devices and (iv) generating and/or displaying a report representing detected deviations between the two sets of parameter state data for each field device within the selected sub-set of the plurality of field devices.

25 Claims, 19 Drawing Sheets

Audit Devices Parameters

- Select Audit Type
- Select Devices
- Select Template
- Select Parameter Set
- Confirmation
- Auditing
- Results

Results

Compare Devices
Audit against Master Reference Parameter Set with Last Saved
Parameter Set (Writable Parameters only)

Audit has been completed successfully

Number of devices selected      35
Number of devices audited       28
Number of devices skipped       07

Report: C:\PRM\Report\AuditDeviceParameters
\Audit_20190917_12.45.04\AuditReport.xlsx Note: The audit report will be saved locally on PRM Client PC

METHODS, SYSTEMS AND COMPUTER PROGRAM PRODUCTS FOR MONITORING FIELD DEVICE STATES IN A PROCESS CONTROL SYSTEM

FIELD OF THE INVENTION

The invention relates to the field of plant resource management. In particular the invention relates to methods, systems and computer program products for monitoring field device states within a process control system, and for detecting and responding to state changes associated with one or more field devices.

BACKGROUND OF THE INVENTION

Industrial environments implement distributed process control systems for running and controlling processes for manufacturing, conversion, or production. Distributed process control systems typically include one or more process controllers that are connected to one or more field devices. Field devices, may include valves, valve actuators, switches, and transmitters (e.g. temperature, pressure, level, and flow sensors) located within the industrial environment, and which are configured for physical control functions or process control functions. Examples of field device control functions include opening or closing valves, measuring process and/or environmental parameters (e.g. temperature or pressure) for controlling one or more processes within the process plant or system.

At the other end, a process controller may be configured to receive signals generated by field devices, wherein the received signals convey information corresponding to process parameters measured by the field devices and/or other information concerning states of the field devices. The process controller may additionally execute a control application that implements one or more control modules for implementing process control decisions. Control modules within the process controller send control signals to field devices through communication networks to control operation of one or more of the field devices. Input-output (I/O) devices that are located as communication intermediaries between a process controller and one or more field devices enable data transfer and control instruction transfers between the process controller and the field devices, by converting electrical signals to digital values and by sending and receiving such signals over one or more communication protocols.

A distributed process control system within a process plant includes one or more process controllers, and each controller is connected to one or more field devices via input/output (I/O) devices. The one or more controllers store control applications and implement the control strategies for the control and operation. A distributed control system may be communicably coupled to a plant resource management platform that tracks or collects data related to the various plant assets or plant equipment, including, but not limited to, field devices, rotating equipment and key machineries, etc. A plant resource management platform stores and provides device-related data and/or performance data for all devices or assets in a plant or group of plants, for the purposes of monitoring the statuses and health of plant assets and conducting maintenance work. Additionally, the plant resource management platform serves as a communication intermediary between a plant operator or an operator terminal on one hand, and one or more field devices on the other hand—for the purposes of enabling efficient configuration, commissioning, inspection and maintenance of such field devices.

FIG. 1 illustrates a distributed process control system 100 of a type that may be used for process control within an industrial environment. Process control system 100 comprises an operator terminal 102, a plant resource management platform 104, and a field device network 106.

Operator terminal 102 comprises any processor implemented terminal device or client device communicably coupled with plant resource management platform 104. Operator terminal 102 may be configured to enable an operator to transmit instructions to and receive data from, plant resource management platform 104.

Plant resource management platform 104 comprises a plant resource management server 104a, a plant resource management database 104b and a plant resource management gateway interface 104c. Plant resource management server 104a may include at least one processor, and one or more transitory and/or non-transitory memories. Plant resource management server 104a may be configured to implement one or more functions of a process controller discussed above. Plant resource management database 104b may include a non-transitory memory based database, configured to store data records corresponding to field devices, including for example, device parameter data, device description files, and device documents corresponding thereto. Plant resource management gateway interface 104c may include a hardware or software network gateway configured to enable transmission and receipt of communications by plant resource management platform 104.

Field device network 106 comprises a plurality of field devices 106a to 106c (i.e. field devices 1 to n) that are communicably coupled with plant resource management platform 104 and/or with a distributed control system within which plant resource management platform 104 is implemented.

During installation and/or operation of field devices within a process control environment (such as an industrial plant), the configurations of such field devices require to be monitored and periodically validated to ensure that they have been properly configured. Monitoring and validation of field device settings are important to avoid:

Improper functional parameter settings,
Improper configuration displays which could cause errors during operations,
Incorrect range settings for device configuration parameters—which could lead to unintended or incorrect operational outcomes, and/or
Incorrect level indications as a result of improper probe dimension settings for one or more field devices.

Field device parameter validation is typically performed:
during construction of a new plant/upgrading of an existing plant,
during or after commissioning of the plant,
after field device replacement within the plant, and/or
periodically in connection with shutdown maintenance.

Existing solutions for field device monitoring and validation rely on a parameter manager tool implemented within a plant resource management platform 104. FIG. 2 illustrates an exemplary screen interface 200 corresponding to a parameter manager tool. The parameter management tool enables an operator to select (through inputs provided at operator terminal 102) at least two sets of parameter state data 202, 204 corresponding to a field device. At least one of the selected two sets of parameter state data 202, 204 represents historical parameter state data corresponding to the field device, while the other of the selected two sets of parameter state data 202, 204 may represent current or most recently saved parameter state data corresponding to the field device. The parameter manager tool simultaneously displays the two sets of parameter state data 202, 204 and enables configuring and managing of the field device configuration based on the comparison.

As illustrated in FIG. 2, any detected differences between the two sets of parameter state data 202, 204 may be marked with colored text or highlighted text as visual aids. In the illustration of FIG. 2, the parameter values 2022, 2042 corresponding to Parameter 3 in each of parameter set 1 (202) and parameter set 2 (204) are different and have therefore been highlighted in different shades. Likewise, the parameter values 2024, 2044 corresponding to Sub-Parameter 1 of Parameter 5 in each of parameter set 1 (202) and parameter set 2 (204) are different and have therefore been highlighted in different shades.

The field device parameters that have been identified as having different states in the two sets of parameter state data 202, 204 thereafter requires to be manually copied to a word processing document, in order to create a report or summary—which is a laborious and time-consuming process, and also relies entirely on the operator spotting the highlighted differences between the two sets of parameter state data 202, 204. Additionally, at any given time, the parameter manager tool permits only two sets of parameter state data 202, 204 to be compared at a time.

Given that a process control system in a plant is likely to have a very large number of field devices (ranging from tens to hundreds of field devices), the prior art solutions have been found to be unsatisfactory for at least the following reasons:

Each field device may include hundreds of different device parameters per device. (for example, a HART device is likely to have between 50-250 parameters, whereas an FF-H1 (fieldbus foundation H1) device can have over 1000 parameters. As a result, reviewing and comparing a pair of parameter sets for even a single field device is exceptionally time and efforts intensive, and the level of required efforts and complexity involved may be understood in view of the fact that it is normal for a plant to have at least 1000 field devices within a process control environment.

Generating a report or summary of detected differences in parameters for each device is also complex and time intensive, because the operator has to individually export results of each comparison, including by manually identifying and copying parameter state data (corresponding to parameters that have been identifying as exhibiting different values across the compared parameter sets), to a word processing document or a spreadsheet.

Validating parameters of field devices is a frequently performed task in plants, and properly validating all parameters for all field devices in a plant could take several days or months using the solutions available in prior art.

There is accordingly a need for a solution that enables monitoring and validation of field device states within a process control system, and for detecting and responding to state changes associated with one or more field devices—which includes:

enables monitoring and validation of field device parameter states, in an automated manner for batches of devices—to enable simultaneous monitoring and validation of a large number of field device parameter states in connection with/association with a large number of field devices, enables automated report generation—wherein detected deviations or differences between two sets of parameter state data can be comprehensively listed, and the report can be conveniently filtered, viewed and/or otherwise modified by a user/operator, enables a user/operator to modify values of parameter data states within a field device, in response to detecting deviations between current parameter data states and one or more reference parameter data states for that field device, enables comparisons between field device parameter data states and predefined parameter data state templates that have been created with settings for various usages or purposes of one or more field devices, enables configuration of report generation to limit the number of field device parameter data states under consideration, based on one or more meaningful parameters (for example, based on whether the data parameters are configurable data parameters).

SUMMARY

The invention relates to the field of plant resource management, and more specifically to methods, systems and computer program products for monitoring field device states within a process control system, and for detecting and responding to state changes associated with one or more field devices.

The invention provides a method for monitoring field device parameter state changes within a process control system comprising a plurality of field devices. The method comprises, for each field device within a selected sub-set of the plurality of field devices (1) retrieving a first set of field device parameter state data associated with the field device, wherein the first set of field device parameter state data represents either (i) reference parameter states associated with the field device, or (ii) a stored set of prior parameter states associated with the field device, and which prior parameter states are distinct from a current set of parameter states associated with the field device, (2) obtaining a second set of field device parameter state data associated with the field device, wherein the second set of field device parameter state data represents a current set of parameter states associated with the field device, (3) comparing the first set of field device parameter state data and the second set of field device parameter state data respectively corresponding to the field device, (4) detecting deviations between the compared first set of field device parameter state data and second set of field device parameter state data, and (5) displaying on a display device, for each field device within the selected sub-set of the plurality of field devices, data representing the detected deviations between the first set of field device parameter state data and the second set of field device parameter state data.

In a method embodiment, the sub-set of the plurality of field devices comprises two or more field devices within the process control system.

In another method embodiment, the second set of field device parameter state data comprises parameter state data that is received from the field device in response to one or more parameter state queries transmitted to the field device.

In a particular embodiment of the method, the second set of field device parameter state data comprises parameter state data that is associated with the field device and which is retrieved from a field device configuration database, wherein retrieved parameter state data comprises a stored set of parameter state data that has been most recently received from the field device.

In a specific method embodiment, (1) the second set of field device parameter state data comprises (i) parameter state data that is received from the field device in response to one or more parameter state queries transmitted to the field device, or (ii) parameter state data that is associated with the field device and which is retrieved from a field device configuration database, wherein retrieved parameter state data comprises a stored set of parameter state data that has been most recently received from the field device, and (2) the first set of field device parameter state data represents parameter state data that has been received from the field device prior to the second set of field device parameter state data, and that has been stored in the field device configuration database.

In another embodiment of the method, field device parameters to which the first set of field device parameter state data and second set of field device parameter state data correspond, are selected based on a received user input, wherein the user input is received through a user interface.

In a specific method embodiment, the field device parameters to which the first set of field device parameter state data and second set of field device parameter state data correspond, consist only of field device parameters having one or more attributes that are user configurable through the user interface. Exemplary configurable parameters may include, but are not limited to, range, device mode, etc.

The method may be implemented such that (1) responsive to the received user input comprising a first user input, the field device parameters to which the first set of field device parameter state data and second set of field device parameter state data correspond comprise only such field device parameters that are shared by all selected field devices belonging to the same class of field devices to which the selected field devices correspond, or (2) responsive to the received user input comprising a second user input, the field device parameters to which the first set of field device parameter state data and second set of field device parameter state data correspond, are field device parameters associated with the field device.

In relation to a "class" of a field device, intelligent field devices such as HART and FF-H1 protocol-supported devices are uniquely identified by manufacturer identification information (i.e. manufacturer ID), information identifying a model (i.e. device type ID) and information identifying a revision (i.e. device revision), which are collectively referred to as a "class" of field device. In some cases, device-class may also be determined based on some additional information, for instance, information of device category and device sub-model. The device category represents a function that a field device performs, for instance, a pressure transmitter measuring pressure data within an industrial process.

In a method embodiment, (1) the received user input is the first user input, (2) the first set of field device parameter state data comprises stored reference parameter state data associated with a plurality of field devices belonging to the same class of field devices to which the field device corresponds, and (3) the stored reference parameter state data is used as a first set of field device parameter state data for two or more field devices within the selected sub-set of the plurality of field devices, wherein the two or more field devices correspond to the identified class of field devices.

In a further embodiment of the method, (1) the received user input is the second user input, and (2) the first set of field device parameter state data comprises stored reference parameter state data associated uniquely with the field device.

In one embodiment of the method, responsive to detection of a deviation between the compared first set of field device parameter state data and second set of field device parameter state data, the stored reference parameter state data associated uniquely with the field device is updated based on an update instruction received through a user input.

In another method embodiment, an alert is generated responsive to detection of a deviation between the compared first set of field device parameter state data and second set of field device parameter state data, wherein the alert generation is based on one or more predefined alert generation rules—for instance, an alert will be issued when the deviation or difference detected exceeds a pre-determined limit or threshold level.

The invention also provides a system for monitoring field device parameter state changes within a process control system. The system comprises (1) a plurality of field devices, and (2) a monitoring server configured, for each field device within a selected sub-set of the plurality of field devices, to (i) retrieve a first set of field device parameter state data associated with the field device, wherein the first set of field device parameter state data represents either (A) reference parameter states associated with the field device, or (B) a stored set of prior parameter states associated with the field device, and which prior parameter states are distinct from a current set of parameter states associated with the field device, (ii) obtain a second set of field device parameter state data associated with the field device, wherein the second set of field device parameter state data represents a current set of parameter states associated with the field device, (iii) compare the first set of field device parameter state data and the second set of field device parameter state data respectively corresponding to the field device, (iv) detect deviations between the compared first set of field device parameter state data and second set of field device parameter state data, and (v) display on a display device, for each field device within the selected sub-set of the plurality of field devices, data representing the detected deviations between the first set of field device parameter state data and the second set of field device parameter state data.

The system may be configured such that the sub-set of the plurality of field devices comprises two or more field devices within the process control system.

In an embodiment, the system is configured such that the second set of field device parameter state data comprises parameter state data that is received from the field device in response to one or more parameter state queries transmitted to the field device.

In another embodiment, the system may be configured so that the second set of field device parameter state data comprises parameter state data that is associated with the field device and which is retrieved from a field device configuration database, wherein retrieved parameter state data comprises a stored set of parameter state data that has been most recently received from the field device.

In a particular system embodiment, (1) the second set of field device parameter state data comprises (i) parameter state data that is received from the field device in response to one or more parameter state queries transmitted to the field device, or (ii) parameter state data that is associated with the field device and which is retrieved from a field device configuration database, wherein retrieved parameter state data comprises a stored set of parameter state data that has been most recently received from the field device, and (2) the first set of field device parameter state data represents parameter state data that has been received from the field device prior to the second set of field device parameter state data, and that has been stored in the field device configuration database.

The system may further be configured such that field device parameters to which the first set of field device parameter state data and second set of field device parameter state data correspond, are selected based on a received user input, wherein the user input is received through a user interface.

In one system embodiment, the field device parameters to which the first set of field device parameter state data and second set of field device parameter state data correspond consist only of field device parameters having one or more attributes that are user configurable through the user interface.

The system may be configured such that (1) responsive to the received user input comprising a first user input, the field device parameters to which the first set of field device parameter state data and second set of field device parameter state data correspond comprise only such field device parameters that are shared by all selected field devices belonging to the same class of field devices to which the selected field devices correspond, or (2) responsive to the received user input comprising a second user input, the field device parameters to which the first set of field device parameter state data and second set of field device parameter state data correspond, are field device parameters associated with the field device.

The system may additionally be configured such that (1) the received user input is the first user input, (2) the first set of field device parameter state data comprises stored reference parameter state data associated with a plurality of field devices belonging to the same class of field devices to which the field device corresponds, and (3) the stored reference parameter state data is used as a first set of field device parameter state data for two or more field devices within the selected sub-set of the plurality of field devices, wherein the two or more field devices correspond to the identified class of field devices.

In a particular system configuration, (1) the received user input is the second user input, and (2) the first set of field device parameter state data comprises stored reference parameter state data associated uniquely with the field device.

The monitoring server may be configured such that, responsive to detection of a deviation between the compared first set of field device parameter state data and second set of field device parameter state data, the stored reference parameter state data associated uniquely with the field device is updated based on an update instruction received through user input.

The monitoring server may additionally be configured to generate an alert responsive to detection of a deviation between the compared first set of field device parameter state data and second set of field device parameter state data, wherein alert generation is based on one or more predefined alert generation rules.

The invention also provides a computer program product for monitoring field device parameter state changes within a process control system comprising a plurality of field devices. The computer program product comprises a non-transitory computer usable medium having a computer readable program code embodied therein, the computer readable program code comprising instructions for implementing within a processor based computing system, the steps of, for each field device within a selected sub-set of the plurality of field devices, (1) retrieving a first set of field device parameter state data associated with the field device, wherein the first set of field device parameter state data represents either (a) reference parameter states associated with the field device, or (b) a stored set of prior parameter states associated with the field device, and which prior parameter states are distinct from a current set of parameter states associated with the field device, (2) obtaining a second set of field device parameter state data associated with the field device, wherein the second set of field device parameter state data represents a current set of parameter states associated with the field device, (3) comparing the first set of field device parameter state data and the second set of field device parameter state data respectively corresponding to the field device, (4) detecting deviations between the compared first set of field device parameter state data and second set of field device parameter state data, and (5) displaying on a display device, for each field device within the selected sub-set of the plurality of field devices, data representing the detected deviations between the first set of field device parameter state data and the second set of field device parameter state data.

BRIEF DESCRIPTION OF THE ACCOMPANYING DRAWINGS

FIGS. 13 and 14 illustrate exemplary interfaces that may be presented to an operator of a process control monitoring server for the purposes of presenting an output of the method of FIG. 4.

DETAILED DESCRIPTION

The invention relates to the field of plant resource management, and more specifically to methods, systems and computer program products for monitoring field device states within a process control system, and for detecting and responding to state changes associated with one or more field devices.

For the purposes of the below written description, the terms "field device", and "sensor(s)" may be used interchangeably and shall be understood as referring to a device or component that is configured to monitor or control parameters corresponding to one or more assets, devices, components, tags, hardware, software or data parameters, within an industrial environment.

For the purposes of the below written description, the terms "field device parameter state(s)" and/or "parameter state(s)" may be used interchangeably and shall be understood as referring to state(s) (or values) of one or more field device configuration parameters—which one or more field device configuration parameters may comprise any parameters that control the operation(s), functions(s), sensitivity, alarm limits, or selectable states of a field device.

Figure 3:
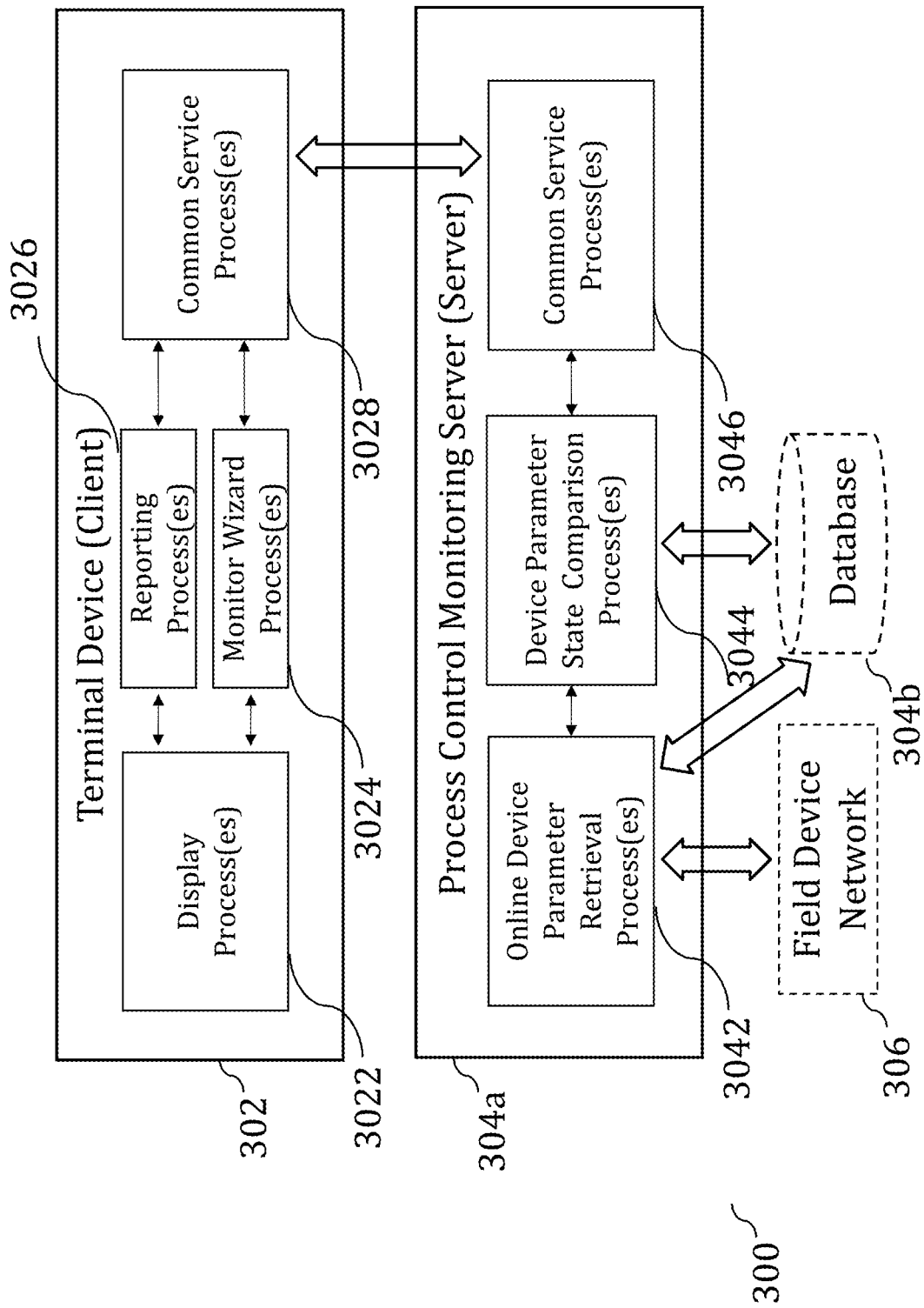
FIG. 3 illustrates processes implemented in various system components within a process control environment in accordance with the present invention.

FIG. 3 illustrates processes implemented in various system components within a process control environment 300 in accordance with the present invention. The process control environment 300 comprises an environment comprising at least terminal device 302, process control monitoring server 304a, field device network 306, and database 304b.

Terminal device 302 may comprise any processor implemented terminal device that is communicably coupled with one or more system components within process control environment 300. In an embodiment, terminal device 302 may comprise an operator terminal within or that is communicably coupled with a plant resource management platform and/or a distributed control system within process control environment 300. Terminal device 302, which may also be referred to as "client", may be configured to enable an operator to transmit instructions to and receive data from, process control monitoring server 304a.

Process control monitoring server 304a may comprise at least one processor, and one or more transitory and/or non-transitory memories and may be configured to implement one or more functions of process control monitoring and field device parameter state monitoring and/or control, in accordance with one or more of the methods discussed below. In an embodiment, process control monitoring server 304a may be implemented within or communicably coupled with a plant resource management platform and/or a distributed control system within process control environment 300.

Field device network 306 may comprise a plurality of HART, FF-H1, or Profibus supported field devices that are communicably coupled with process control monitoring server 304a and/or with a plant resource management platform via industrial networks, for instance, Vnet and Ethernet or with a distributed control system within which process control monitoring server 304a is implemented.

Database 304b may comprise a non-transitory memory based storage or repository which may be communicably coupled with process control monitoring server 304a—and which may be configured for enabling retrievable storage of parameter state data corresponding to one or more field devices within field device network 306.

As illustrated in FIG. 3, process control monitoring server 304a may be configured to implement (i) processes 3042 for online device parameter retrieval—which may include retrieval of current parameter state data from one or more field devices within field device network 306, (ii) processes 3044 for comparing device parameter states of one or more field devices within field device network 306 against historical parameter states, reference parameter states or template parameter states of one or more field devices within field device network 306—wherein the comparison process may include retrieval of any of historical parameter states, reference parameter states or template parameter states of one or more field devices within field device network 306, from database 304b, and (iii) processes 3046 for implementing common services within process control monitoring server 304a—for example, administering and managing memory, security, file and directory structures, auditing, alert notification, logging, networking and messaging, which can be commonly performed for various other processes or transactions implemented by process control monitoring server 304a. In an embodiment, the common services processes 3046 may enable network communication with the corresponding common service processes 3028 within terminal device 302.

Terminal device 302 may be configured to implement (i) processes 3022 for implementing display functions—which include displaying information or data received from process control monitoring server 304a, (ii) processes 3024 for implementation of a monitor wizard—wherein the monitor wizard comprises a software implemented tool for enabling an operator to control field device parameter state monitoring through inputs provided at the terminal device 302 (through display processes 3022 and one or more I/O processes), (iii) processes 3026 for reporting to an operator (for example, through display processes 3022) the results of field device parameter state monitoring that has been implemented at process control monitoring server 304a, and (iv) processes 3028 for implementing common services within terminal device 302—for example, administering and managing memory, security, file and directory structures, auditing, alert notification, logging, networking and messaging, which can be commonly performed for various other processes or transactions implemented by process control monitoring server 304a. As discussed above, the common services processes 3028 may enable network communication with the corresponding common service processes 3046 within process control monitoring server 304a.

Further functionalities and configurations for the system components of FIG. 3 are discussed in more detail in connection with FIGS. 4 to 16 below.

Figure 4:
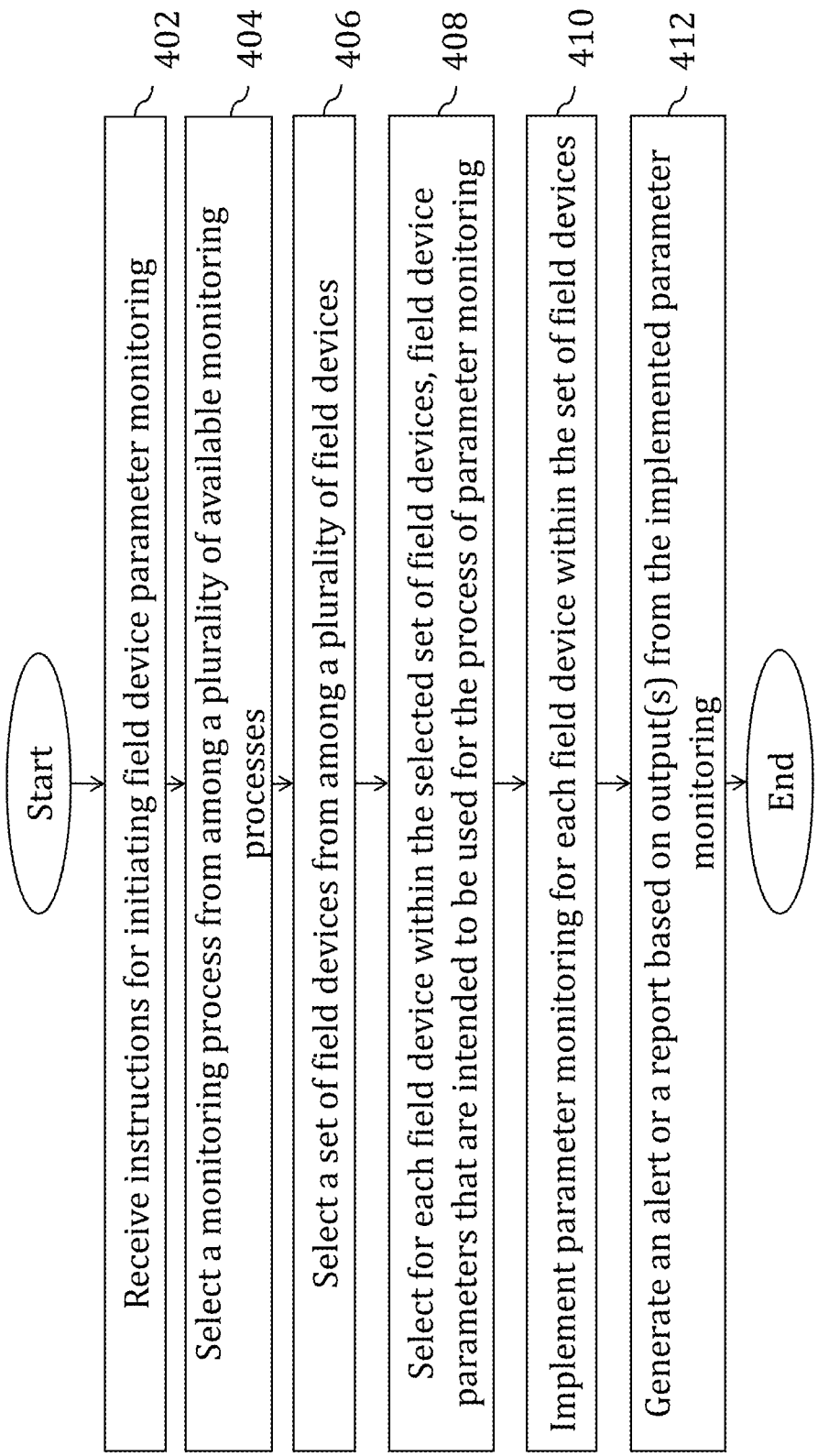
FIG. 4 is a flowchart illustrating a method of field device parameter monitoring in accordance with the present invention.

FIG. 4 is a flowchart illustrating a method of field device parameter monitoring in accordance with the present invention. The method of FIG. 4 may, in an embodiment, be implemented partly or entirely within process control monitoring server 304a, or within a process control management platform or within a distributed control system within process control environment 300.

Step 402 comprises receiving instruction(s) for initiating field device parameter monitoring. The instruction(s) of step 402 may be received from terminal device 302, and in an embodiment may have been initiated by one or more operator inputs provided through terminal device 302.

Step 404 comprises selecting a monitoring process from among a plurality of available processes for monitoring field device parameter state data. In an embodiment, the plurality of available processes for monitoring field device parameter state data may include at least (i) a first monitoring process based on a comparison of a current set of parameter states associated with a field device, with a reference set of parameter states associated with the same field device and (ii) a second monitoring process based on a comparison of a current set of parameter states associated with a field device, with a template set of parameter states associated with the field device or with a class within which the field device is classified. Each of these first and second monitoring processes are disclosed in more detail in the following discussion concerning FIG. 5 and FIG. 6. The selection of a monitoring process at step 404 may be received from terminal device 302, and in an embodiment may be implemented based on one or more operator inputs provided through terminal device 302.

Step 406 comprises selecting a set of field devices from among a plurality of field devices, for implementing the selected process of field device parameter monitoring. The plurality of field devices may consist of two or more field devices within field device network 306 in process control environment 300. The set of field devices selected at step 406 comprise one or more field devices to which the selected process for field device parameter monitoring at step 404, according to the teachings of the present invention, is intended to be applied. Embodiments of the step 406 of selecting a set of field devices are disclosed in more detail in the following discussion concerning FIG. 7 and FIGS. 8A and 8B. The selection of a set of field devices at step 406 may be received from terminal device 302, and in an embodiment the selection may be implemented based on one or more operator inputs provided through terminal device 302.

Step 408 comprises selecting for each field device within the set of field devices, one or more field device parameters that are intended to be used for the process of parameter monitoring. The one or more field device parameters corresponding to a field device may be selected from among a plurality of monitorable, measurable or detectable parameters corresponding to that field device. Embodiments of the step of selecting field device parameters for field devices within the set of field devices, are disclosed in more detail in the following discussion concerning FIG. 9. The selection of field device parameters corresponding to each field device within the selected set of field devices may be received from terminal device 302, and in an embodiment the selection may be implemented based on one or more operator inputs provided through terminal device 302.

Step 410 comprises implementing parameter monitoring for each field device within the set of field devices selected at step 406. The parameter monitoring at step 410 comprises (i) retrieving a first set of field device parameter state data corresponding to each field device within the set of field devices selected at step 406—wherein the first set of field device parameter state data for each field device is either of a reference set of field device parameter state data or a template set of field device parameter state data associated with such field device, (ii) retrieving a second set of field device parameter state data corresponding to each field device within the set of field devices selected at step 408—wherein the second set of field device parameter state data for each field device represents a current set of parameter states associated with the field device, and (iii) for each field device within the set of field devices selected at step 406, comparing the first set of field device parameter state data and second set of field device parameter state data, and identifying any deviations or differences between said first set and second set of field device parameter state data. Embodiments of the step of parameter monitoring for each field device 410 within the set of field devices selected at step 406 are disclosed in more detail in the following discussion concerning FIGS. 10 to 12B.

Step 412 comprises generating an alert or a report based on outputs from the implemented parameter monitoring. In an embodiment, the alert or report may include information identifying or highlighting any deviations or differences between the first set and second set of field device parameter state data that have been detected at step 410. Further details regarding the step of generating an alert or report, are disclosed in the following discussion concerning 13 and 14.

Figure 5:
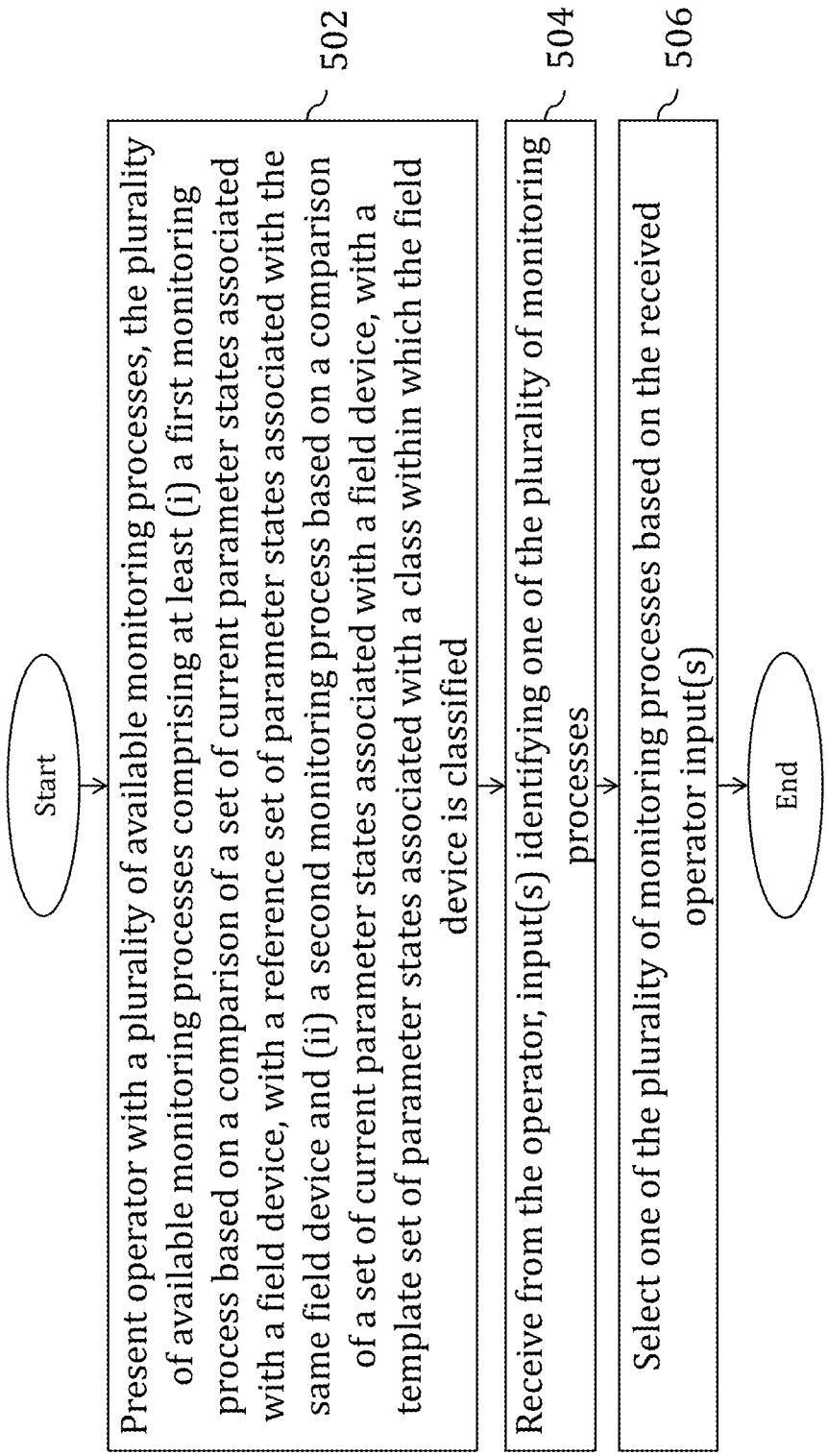
FIG. 5 is a flowchart illustrating a method of selecting a monitoring process from among a plurality of available monitoring processes, for the purposes of implementing the method of FIG. 4.

FIG. 5 is a flowchart illustrating a method of selecting a monitoring process from among a plurality of available monitoring processes, for the purposes of implementing the method of FIG. 4. In an embodiment, the method of FIG. 5 is implemented as part of method step 404 of FIG. 4. The steps of FIG. 5 may, in an embodiment, be implemented partly or entirely within process control monitoring server 304a, or within a process control management platform or within a distributed control system within process control environment 300.

Step 502 comprises presenting an operator with a plurality of available monitoring processes. The available monitoring processes may be presented to the operator at a display integrated within or coupled with terminal device 302. In an embodiment, the plurality of available monitoring processes comprises at least (i) a first monitoring process based on or involving a comparison of a set of current parameter states associated with a field device, with a reference set of parameter states associated with the same field device and (ii) a second monitoring process based on a comparison of a set of current parameter states associated with a field device, with a template set of parameter states associated with the field device itself, or associated with a class within which the field device is classified.

In an embodiment of the first monitoring process, the set of current parameter states for a field device comprises a set of parameter states retrieved from the field device when it is communicably coupled with process control monitoring server 304a, or from a most recently saved (or a currently saved) set of parameter states corresponding to the field device and which are retrievable from a historian database (for example, database 304b). In embodiments of the first monitoring process, the reference set of parameter states for a field device comprises either (i) predefined parameter states associated with the field device—for example, default parameter states or recommended parameters states that have been established for the field device, by a manufacturer of the field device, a service engineer of a field device vendor, a customer or an installer of the field device, or by an operator of a plant resource management platform or a distributed control system within a process control environment, or (ii) a previously saved set of parameter states corresponding to the field device, which have been saved prior to the most recently saved (or currently saved) parameter states corresponding to the field device, and which are retrievable from a historian database (for example, database 304*b*).

In an embodiment of the second monitoring process, the set of current parameter states for a field device comprises a set of parameter states retrieved from the field device when it is communicably coupled with process control monitoring server 304*a*, or from a most recently saved (or a currently saved) set of parameter states corresponding to the field device and which are retrievable from a historian database (for example, database 304*b*). In embodiments of the second monitoring process, the template set of parameter states is a set of predefined parameter states associated with the field device itself or associated with a class of field devices within which the field device is classified. In particular embodiments, the template set of parameters states may be established or defined by any of the manufacturer of the field device, a service engineer of a field device vendor, a customer or an installer of the field device, or by an operator of a plant resource management platform or a distributed control system within a process control environment. In an embodiment where the template set of parameter states is a set of predefined parameter states associated with a class of field devices. A class of a field device is determined by device manufacturer/vendor, device model and device revision. In other words, field devices belonging to the same class may have the same device manufacturer/vendor, the same device model number, and the same device revision number.

Step 504 comprises receiving from the operator, one or more inputs identifying one process from the plurality of monitoring processes. In an embodiment, step 504 comprises receiving from the operator, operator input(s) identifying either the first monitoring process or the second monitoring process. The operator input(s) may in an embodiment be received through an I/O interface within terminal device 302.

Step 506 thereafter comprises selecting one process from the plurality of monitoring processes based on the received operator input(s)—which selected monitoring process is thereafter used for the purposes of implementing parameter monitoring in accordance with the teachings of the method of FIG. 4.

Figure 6:
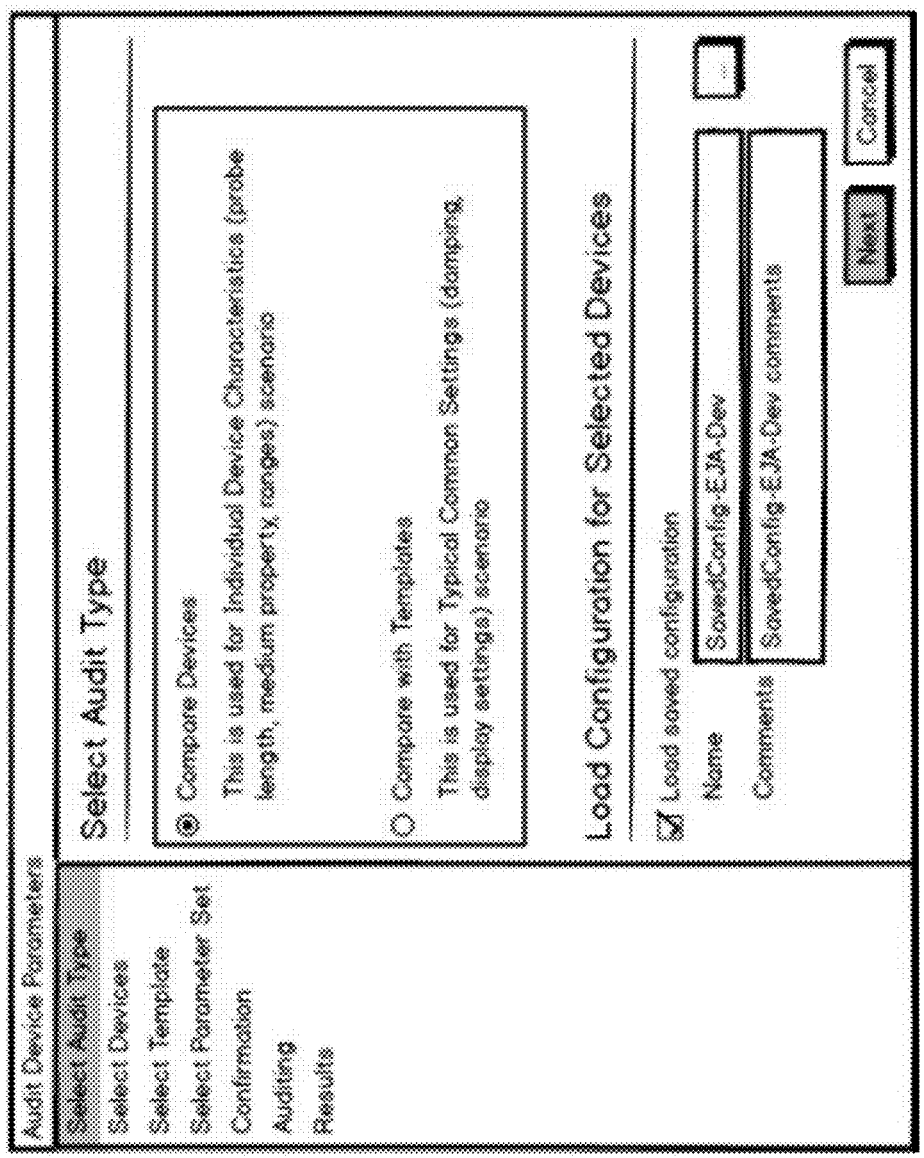
FIG. 6 illustrates an exemplary interface that may be presented to an operator of a process control monitoring server for the purposes of implementing the method of FIG. 5.

FIG. 6 illustrates an exemplary interface 600 that may be presented to an operator of a process control monitoring server for the purposes of implementing the method of FIG. 5. As can be seen in exemplary interface 600, the operator is presented with an option for selecting an "Audit Type" (wherein the "Audit Type" refers to a selectable monitoring process for monitoring parameter states of field devices)—and wherein the operator is offered with a selection between a first monitoring process titled "Compare Devices" and a second monitoring process titled "Compare with Templates". Based on the descriptive data accompanying each option in exemplary interface 600, it would be understood that (i) the first monitoring process titled "Compare Devices" comprises a monitoring process based on or involving a comparison of a set of current parameter states associated with a field device, with a reference set of parameter states associated with the same field device, and (ii) the second monitoring process titled "Compare with Templates" comprises a monitoring process based on or involving a comparison of a set of current parameter states associated with a field device, with a template set of parameter states associated with a field device itself, or associated with a class within which the field device is classified.

Figure 7:
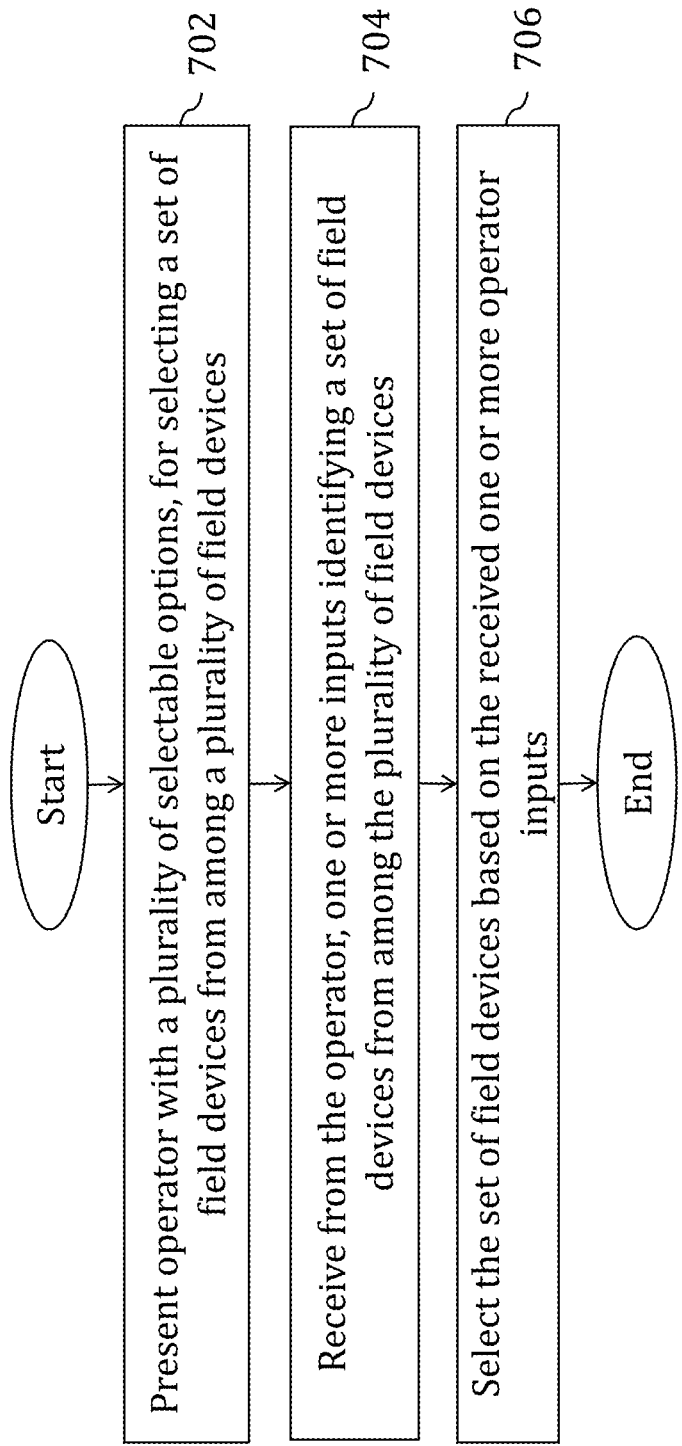
FIG. 7 is a flowchart illustrating a method of selecting a set of field devices from among a plurality of field devices, for the purposes of implementing the method of FIG. 4.

FIG. 7 is a flowchart illustrating a method of selecting a set of field devices from among a plurality of field devices, for the purposes of implementing the method of FIG. 4. In an embodiment, the method of FIG. 7 is implemented as part of method step 406 of FIG. 4. The steps of FIG. 7 may, in an embodiment, be implemented partly or entirely within process control monitoring server 304*a*, or within a process control management platform or within a distributed control system within process control environment 300.

Step 702 comprises presenting an operator with a plurality of selectable options, for selecting a set of field devices from among a plurality of field devices. The plurality of field devices may be presented to the operator at a display integrated within or coupled with terminal device 302.

Step 704 comprises receiving from the operator, one or more inputs identifying a set of field devices from among the plurality of field devices, which the operator intends to select for parameter monitoring in accordance with the method of FIG. 4. The operator input(s) may in an embodiment be received through an I/O interface within terminal device 302.

Step 706 comprises selecting the identified set of field devices (that have been identified at step 704), based on the received one or more operator inputs.

Figure 8A:
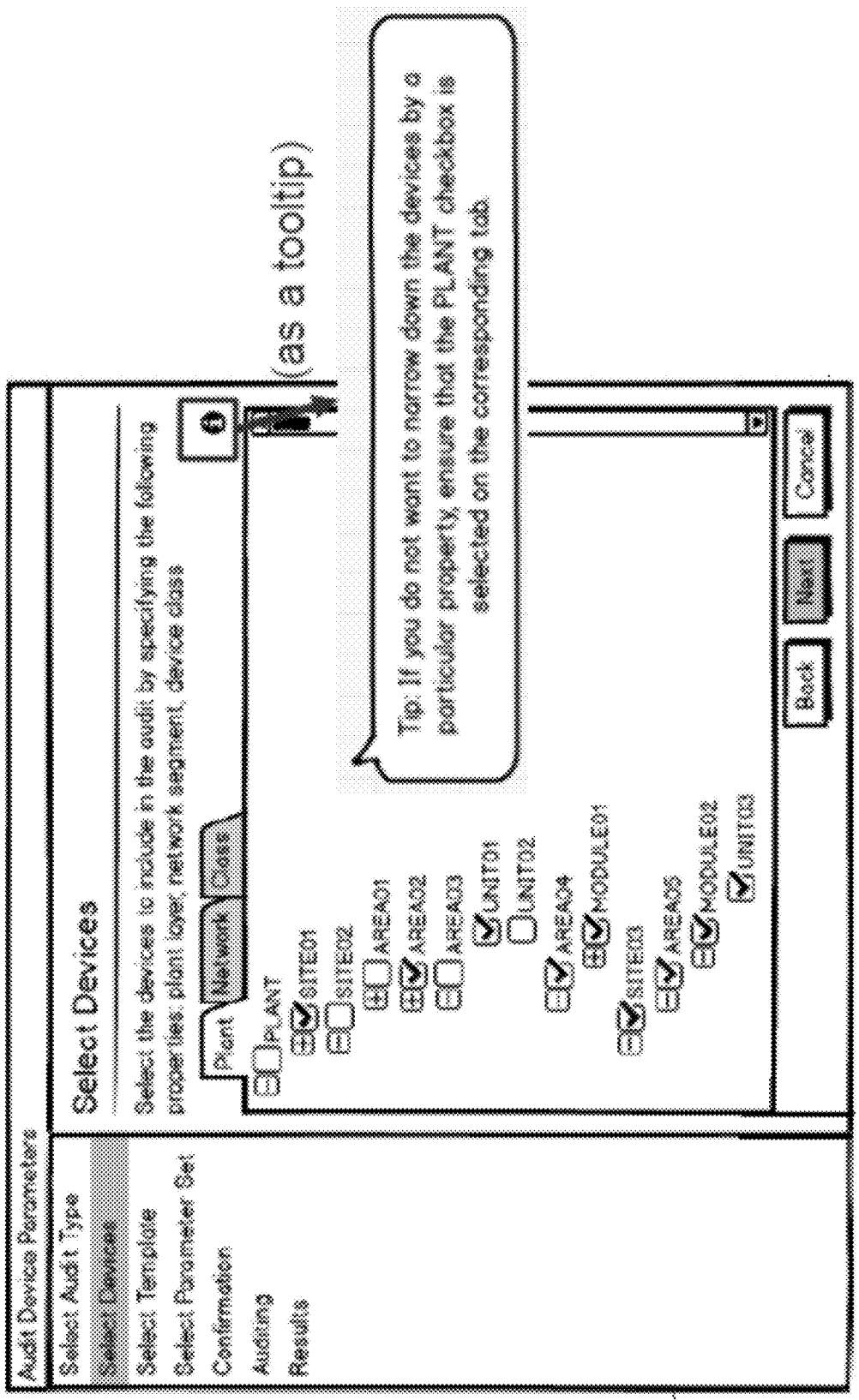
FIGS. 8A and 8B illustrate exemplary interfaces that may be presented to an operator of a process control monitoring server for the purposes of implementing the method of FIG. 7.
Figure 8B:
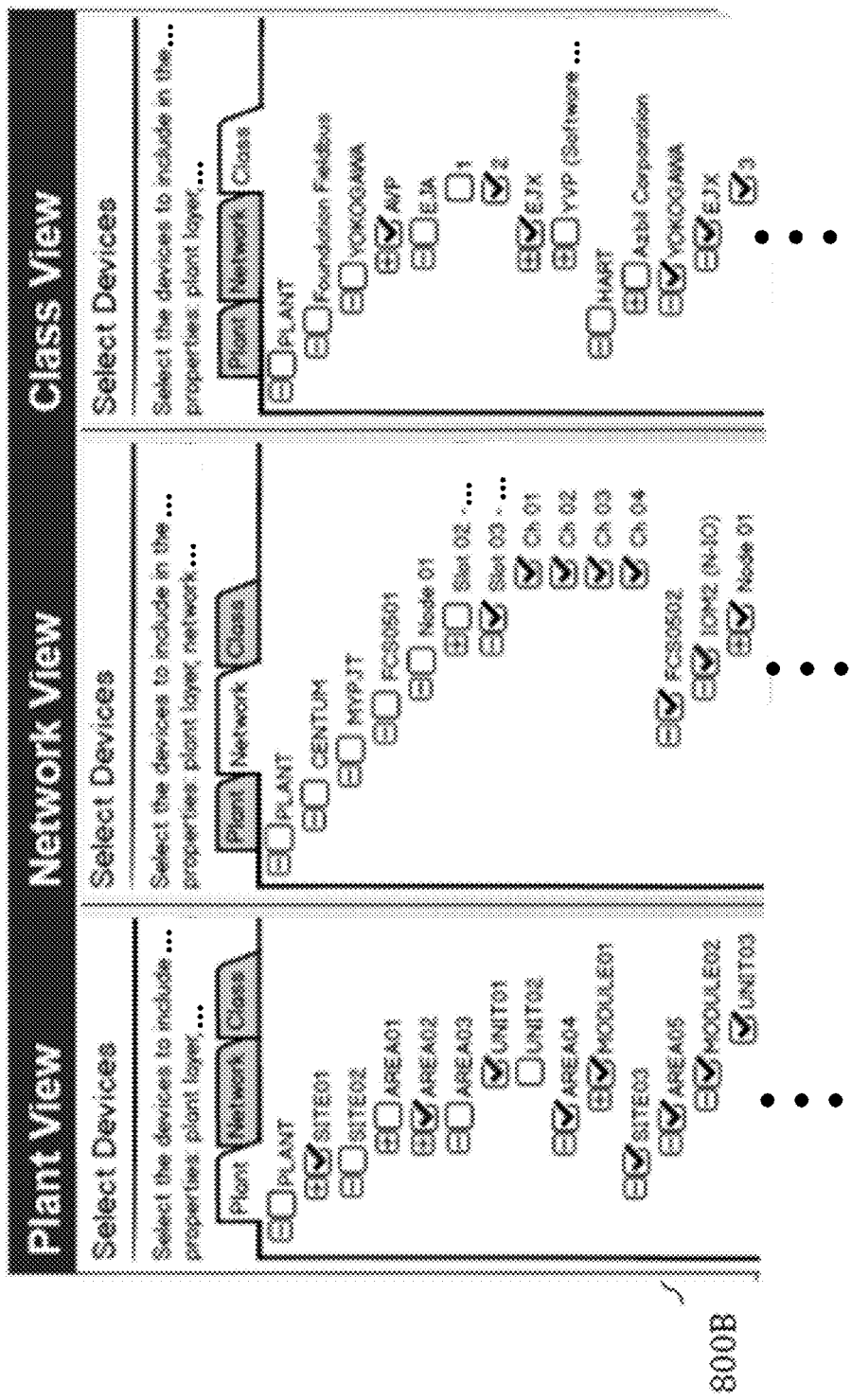

FIGS. 8A and 8B illustrate exemplary interface screens 800A and 800B that may be presented to an operator of a process control monitoring server for the purposes of implementing the method of FIG. 7. As can be seen in the illustrated interface screens 800A and 800B, the operator is presented with interfaces that enable selection of field devices of interest for parameter monitoring. The operator can filter and select one or more field devices based on multiple different filter options, including one or more of "Plant View", "Network View" or "Class View". "Plant View" displays the devices and equipment modules in the plant in the form of a plant hierarchy tree view, and displays multiple different hierarchical layers, which may comprise, Site, Area, Cell, Unit, and Module. "Network View" displays the network hierarchy of devices connected to the field network, in the form of a tree view. "Class View" groups devices into different device classes that are defined by a combination of the following types, i.e. device vendor, device model, device revision, communication type, device category (optional) and device sub-model (optional).

Figure 9:
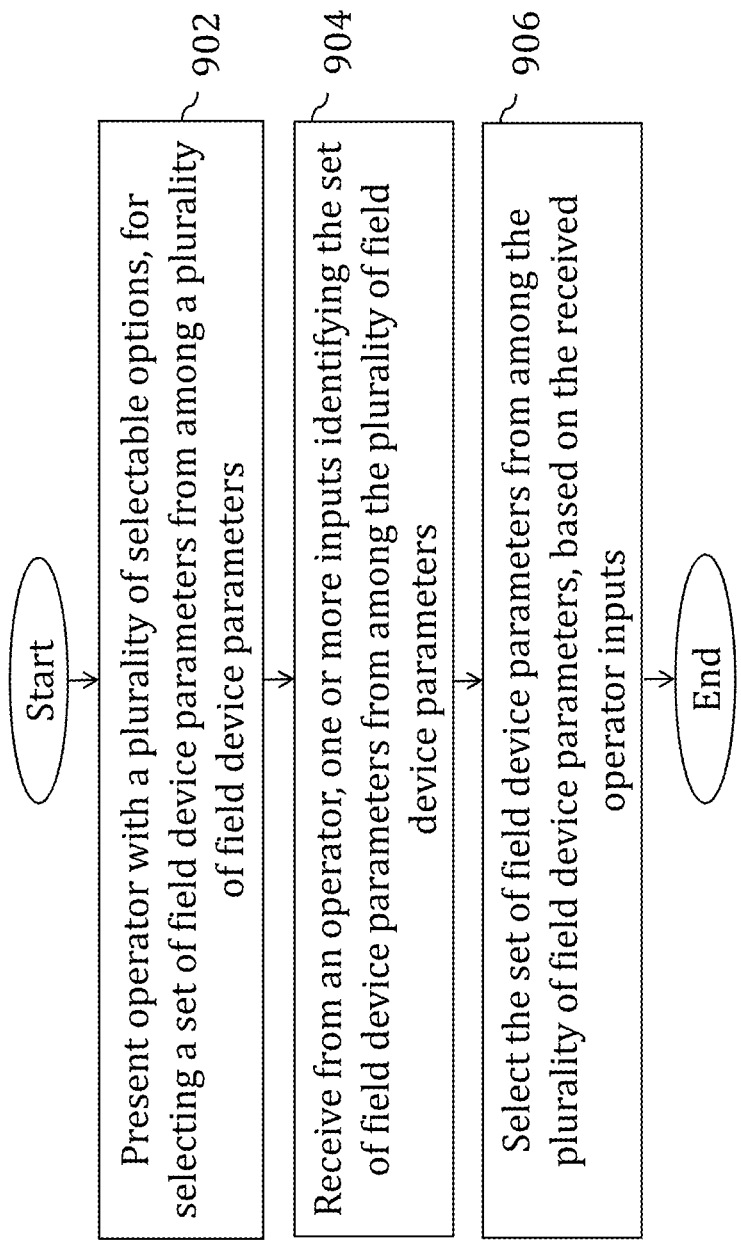
FIG. 9 is a flowchart illustrating a method of selecting a set of field device parameters from among a plurality of field device parameters, for the purposes of implementing the method of FIG. 4.

FIG. 9 is a flowchart illustrating a method of selecting a set of field device parameters from among a plurality of field device parameters, for the purposes of implementing the method of FIG. 4. In an embodiment, the method of FIG. 9 is implemented as part of method step 408 of FIG. 4. The steps of FIG. 9 may, in an embodiment, be implemented partly or entirely within process control monitoring server 304*a*, or within a process control management platform or within a distributed control system within process control environment 300.

Step 902 comprises presenting an operator with a plurality of selectable options, for selecting a set of field device parameters from among a plurality of field device parameters associated with a field device. The plurality of field device parameters may be presented to the operator at a display integrated within or coupled with terminal device 302.

Step 904 comprises receiving from the operator, one or more inputs identifying a set of field device parameters from among the plurality of field device parameters that are presented to the operator for selection (at step 902). The operator input(s) may in an embodiment be received through an I/O interface within terminal device 302.

Step 906 comprises selecting the identified set of field device parameters (that have been identified at step 904), based on the received operator inputs.

Figure 10:
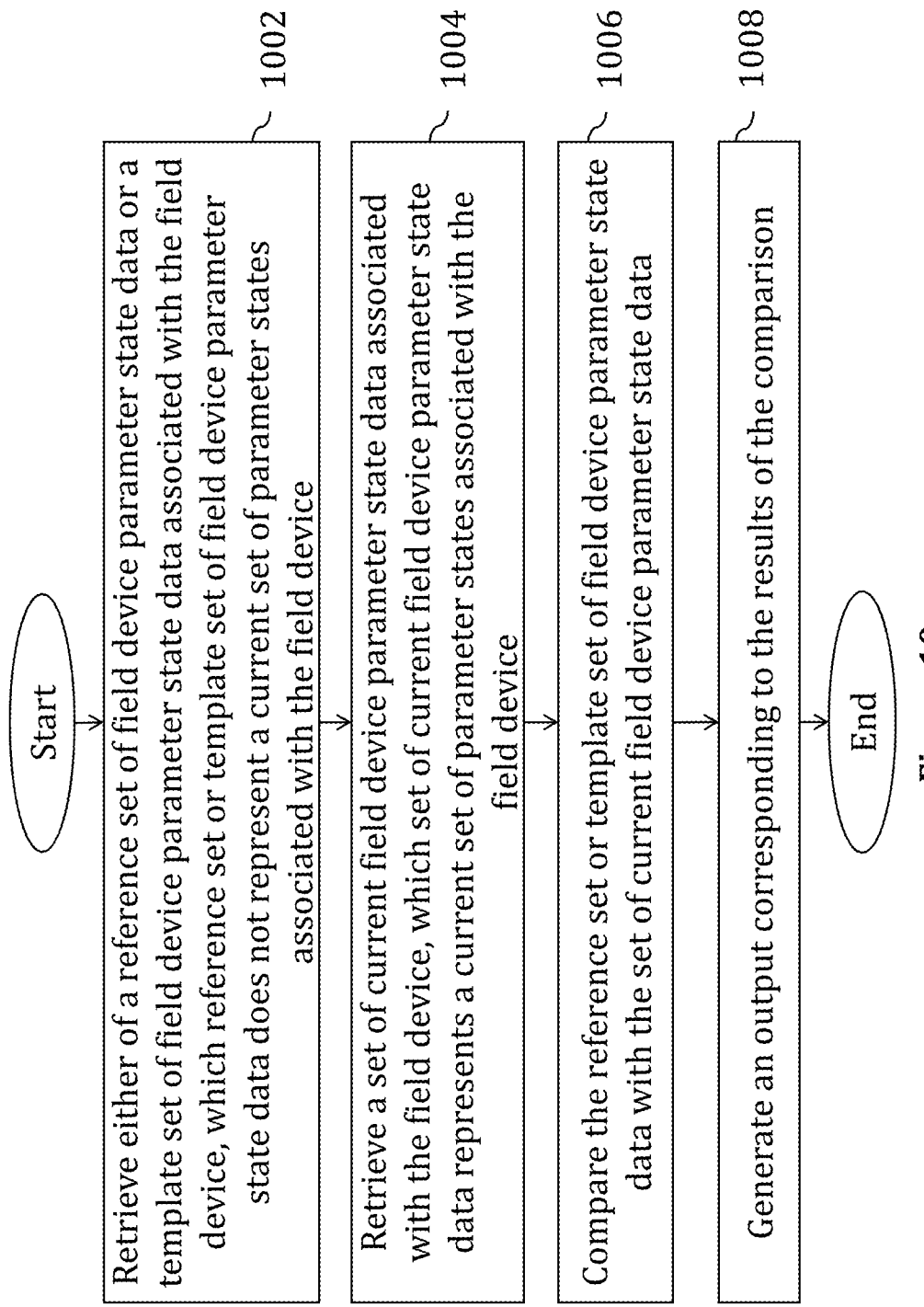
FIG. 10 is a flowchart illustrating a method of comparing a reference set or a template set of field device parameter state data with a set of current field device parameter state data, for the purposes of implementing the method of FIG. 4.

FIG. 10 is a flowchart illustrating a method of comparing a reference set or a template set of field device parameter state data with a set of current field device parameter state data, for the purposes of implementing the method of FIG. 4. In an embodiment, the method of FIG. 10 is implemented as part of method step 410 of FIG. 4. The steps of FIG. 10 may, in an embodiment, be implemented partly or entirely within process control monitoring server 304*a*, or within a process control management platform or within a distributed control system within process control environment 300.

Step 1002 comprises retrieving either a reference set of field device parameter state data or a template set of field device parameter state data associated with the field device, which reference set or template set of field device parameter state data does not represent a current set of parameter states associated with the field device. In an embodiment of the invention where step 404 of FIG. 4 has involved selection of a first monitoring process (i.e. a monitoring process based on a comparison of a current set of parameter states associated with a field device, with a reference set of parameter states associated with the same field device) for monitoring field device parameter state data, step 1002 comprises retrieving a reference set of field device parameter state data associated with the field device. In an embodiment of the invention where step 404 of FIG. 4 has involved selection of a second monitoring process (i.e. a monitoring process based on a comparison of a current set of parameter states associated with a field device, with a template set of parameter states associated with the field device or associated with a class within which the field device is classified) for monitoring field device parameter state data, step 1002 comprises retrieving a template set of field device parameter state data associated with the field device.

In an embodiment of step 1002, the reference set of field device parameter state data or the template set of field device parameter state data associated with the field device, consists only of field device parameters that have one or more attributes that are user configurable—for example through a user interface or an operator interface.

Step 1004 comprises retrieving a set of current field device parameter state data associated with the field device, which set of current field device parameter state data represents a current set of parameter states associated with the field device. The current field device parameter state data may either be retrieved from a memory of the field device itself (if the field device is communicably coupled with process control monitoring server 304*a*) or from a historian database 304*b* that stores a most recently saved (or currently saved) set of parameter states corresponding to the field device. In an embodiment of step 1004, the retrieved set of current field device parameter state data comprises parameter state data that is received from the field device in response to one or more parameter state queries transmitted to the field device (for example, from process control monitoring server 304*a*).

In an embodiment of step 1004, the set of current field device parameter state data associated with the field device, consists only of field device parameters that have one or more attributes that are user configurable—for example through a user interface or an operator interface.

In one embodiment of the method of FIG. 10, (i) responsive to receiving a first user input, the template set of field device parameter state data associated with the field device retrieved at step 1002, and the set of current field device parameter state data retrieved at step 1004, comprise only such field device parameters that are shared by all selected field devices belonging to the same class of field devices to which the selected field device corresponds, and (ii) responsive to receiving a second user input (that is different from the first user input), the reference set of field device parameter state data associated with the field device retrieved at step 1002, and the set of current field device parameter state data retrieved at step 1004, comprise field device parameters that are associated with the field device itself.

In a more particular embodiment of the above, responsive to the received user input comprising the first user input, (i) the template set of field device parameter state data associated with the field device retrieved at step 1002 comprises stored reference parameter state data associated with a plurality of field devices within an identified class of field devices to which the field device corresponds.

In another embodiment of the above, where the received user input is the second user input, the reference set of field device parameter state data associated with the field device retrieved at step 1002 comprises field device parameters that are associated with the field device itself, and the set of current field device parameter state data associated with the field device that is retrieved at step 1004 comprises stored current reference parameter state data associated uniquely with the field device.

Step 1006 comprises comparing (i) the reference set or template set of field device parameter state data retrieved at step 1002, against (ii) the set of current field device parameter state data retrieved at step 1004—to identify any deviations or differences between the two.

Step 1008 comprises generating a report or document that contains one or more outputs or results of the comparison at step 1006. In an embodiment, the report or document includes at least a summary or detailed report of the deviations or differences identified at step 1006, with information identifying the field device and the field device parameter states to which such deviations or differences correspond.

In an embodiment of the method of FIG. 10, the method may additionally include the step of generating an alert in response to step 1006 resulting in detection of a deviation or difference between field device parameter state data, as a result of comparing (i) the reference set or template set of field device parameter state data retrieved at step 1002, against (ii) the set of current field device parameter state data retrieved at step 1004. In an embodiment of the invention, generation of the alert may be based on one or more predefined alert generation rules.

In a further embodiment of the method of FIG. 10, the method may additionally include the step of responding to detection of a deviation or difference (at step 1006) between field device parameter state data, as a result of comparing (i) the reference set or template set of field device parameter state data retrieved at step 1002, against (ii) the set of current field device parameter state data retrieved at step 1004. In an embodiment of the invention, generation of the alert may be based on one or more predefined alert generation rules—by updating stored reference parameter state data that is associated uniquely with the field device, wherein the update is based on an update instruction received through user input.

In yet another embodiment of the method of FIG. 10, the method may additionally include the step of responding to detection of a deviation or difference (at step 1006) between field device parameter state data, as a result of comparing (i) the reference set or template set of field device parameter state data retrieved at step 1002, against (ii) the set of current field device parameter state data retrieved at step 1004. In an embodiment of the invention, generation of the alert may be based on one or more predefined alert generation rules—by updating a local memory within the field device one or more items or parameter state data from the reference set or template set of field device parameter state data retrieved at step 1002.

Figure 11A:
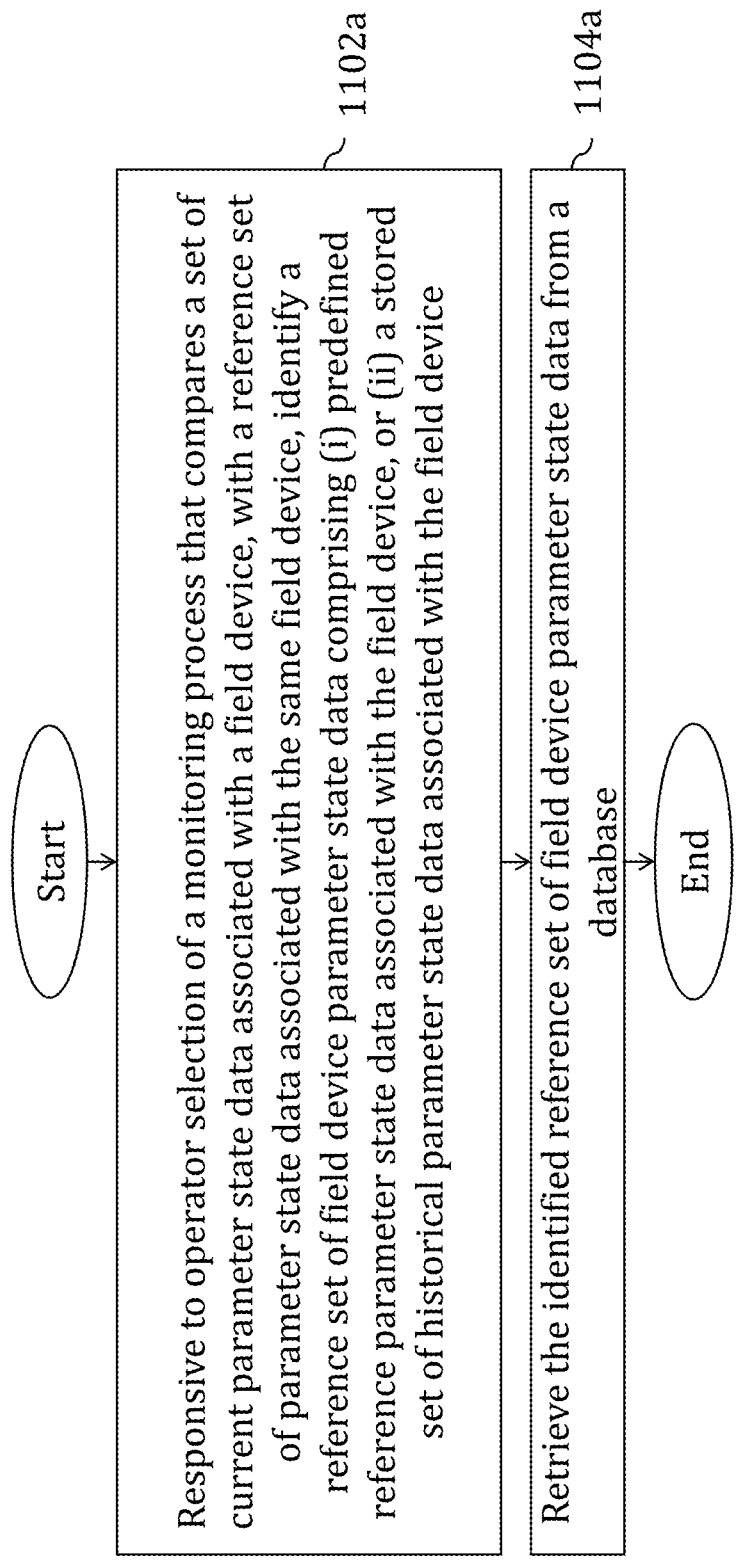
FIG. 11A is a flowchart illustrating a method of identifying and retrieving a reference set of field device parameter state data, for the purposes of implementing the method of FIG. 10.

FIG. 11A is a flowchart illustrating a method of identifying and retrieving a reference set of field device parameter state data, for the purposes of implementing the method of FIG. 10. In an embodiment, the method of FIG. 11A is implemented as part of method step 1002 of FIG. 10. The steps of FIG. 11A may, in an embodiment, be implemented partly or entirely within process control monitoring server 304a, or within a process control management platform or within a distributed control system within process control environment 300.

Step 1102a comprises responding to operator selection of a monitoring process that compares a set of current parameter state data associated with a field device, with a reference set of parameter state data associated with the same field device (i.e. operator selection of the first monitoring process described in connection with FIG. 5), by identifying a reference set of field device parameter state data comprising (i) predefined reference parameter state data associated with the field device, or (ii) a stored set of historical parameter state data associated with the field device.

Step 1104a thereafter comprises retrieving the identified reference set of field device parameter state data from a database—which may subsequently be used for the comparison step 1006 that has been described in connection with FIG. 10.

Figure 11B:
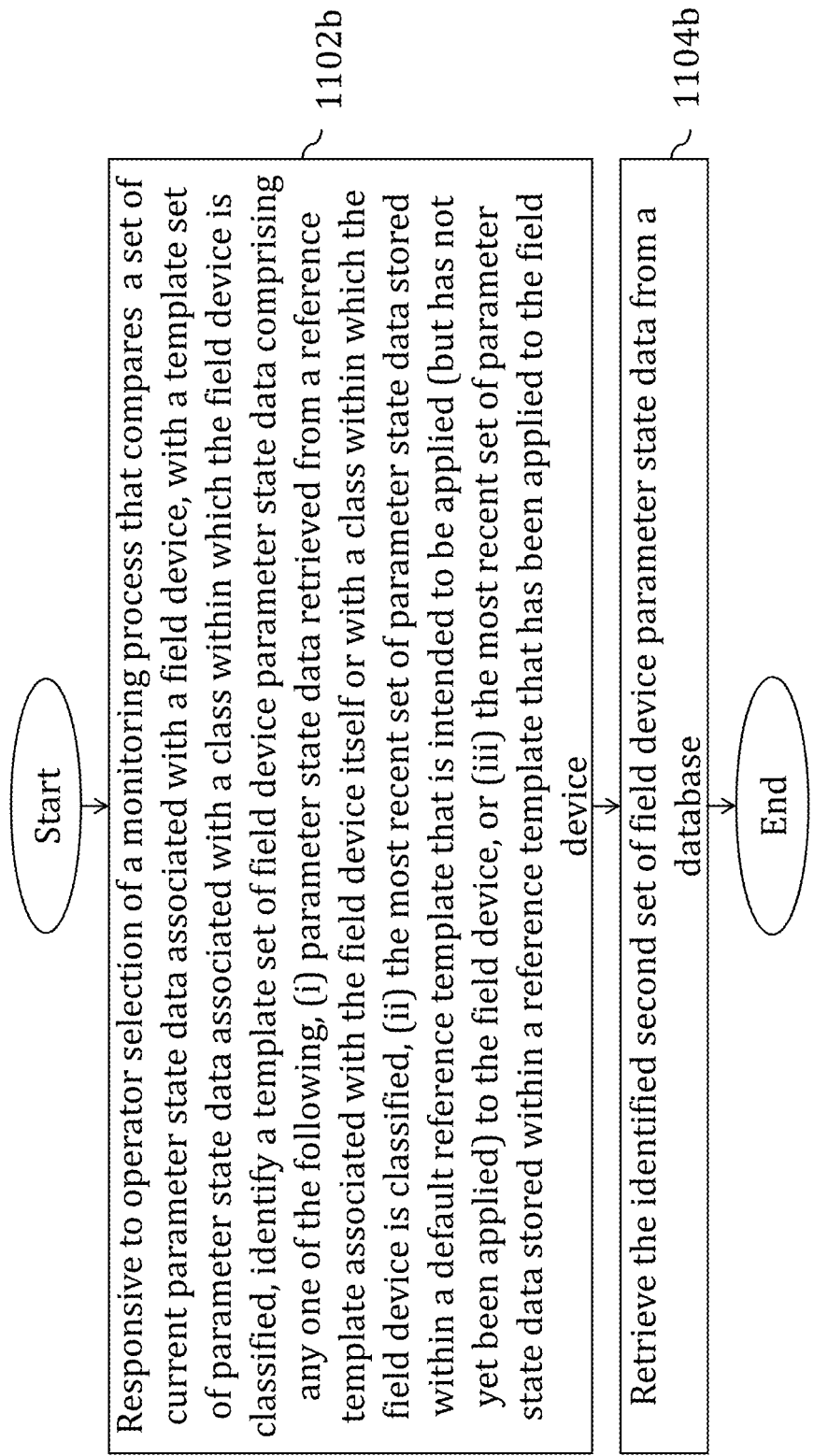
FIG. 11B is a flowchart illustrating a method of identifying and retrieving a template set of field device parameter state data, for the purposes of implementing the method of FIG. 10.

FIG. 11B is a flowchart illustrating a method of identifying and retrieving a template set of field device parameter state data, for the purposes of implementing the method of FIG. 10. In an embodiment, the method of FIG. 11B is implemented as part of method step 1002 of FIG. 10. The steps of FIG. 11B may, in an embodiment, be implemented partly or entirely within process control monitoring server 304a, or within a process control management platform or within a distributed control system within process control environment 300.

Step 1102b comprises responding to operator selection of a monitoring process that compares a set of current parameter state data associated with a field device, with a template set of parameter state data associated with a field device itself or with a class within which the field device is classified, identify a template set of field device parameter state data comprising any one of the following (i) parameter state data retrieved from a reference template associated with the field device itself or with a class within which the field device is classified, (ii) the most recent set of parameter state data stored within a default reference template that is intended to be applied (but has not yet been applied) to the field device, or (iii) the most recent set of parameter state data stored within a reference template that has been applied to the field device. "Apply" could be understood in such that parameter data and other types of data within a template will be downloaded by a field device for the purposes of configuration or others.

Step 1104b thereafter comprises retrieving the identified reference set of field device parameter state data from a database—which may subsequently be used for the comparison step 1006 that has been described in connection with FIG. 10.

Figure 12A:
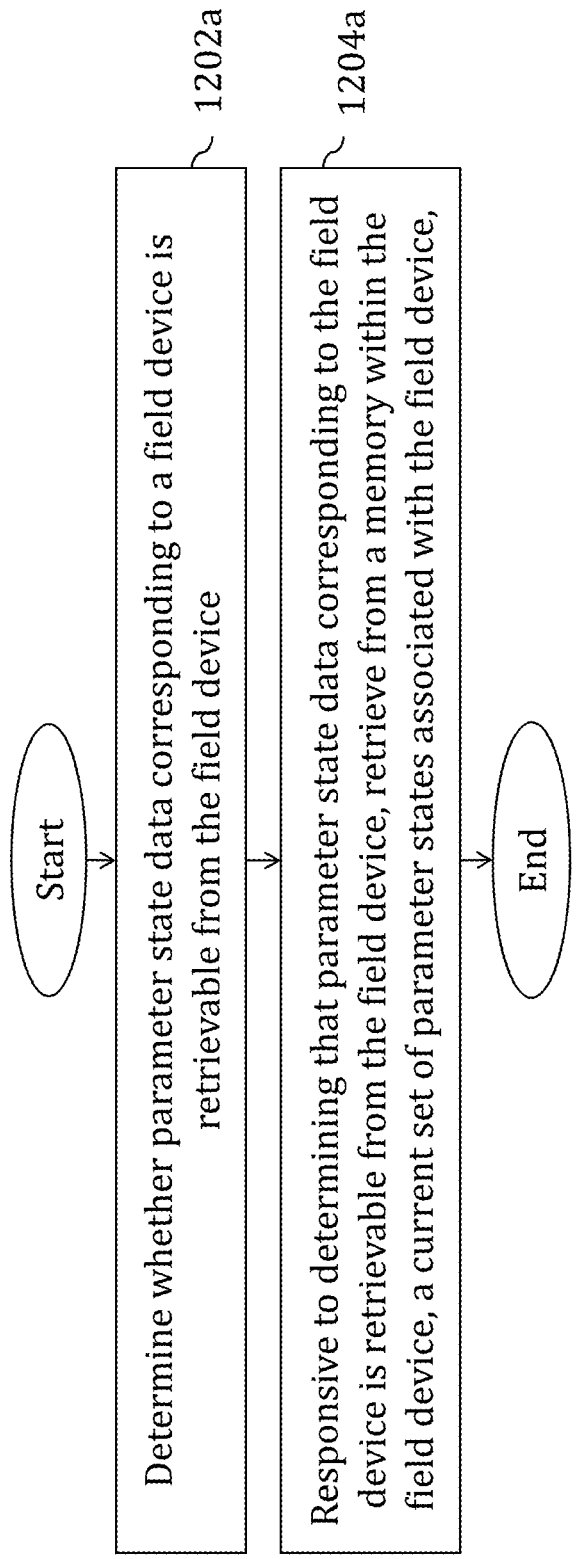
FIGS. 12A and 12B illustrate exemplary method embodiments for retrieving a set of current field device parameter state data, for the purposes of implementing the method of FIG. 10.
Figure 12B:
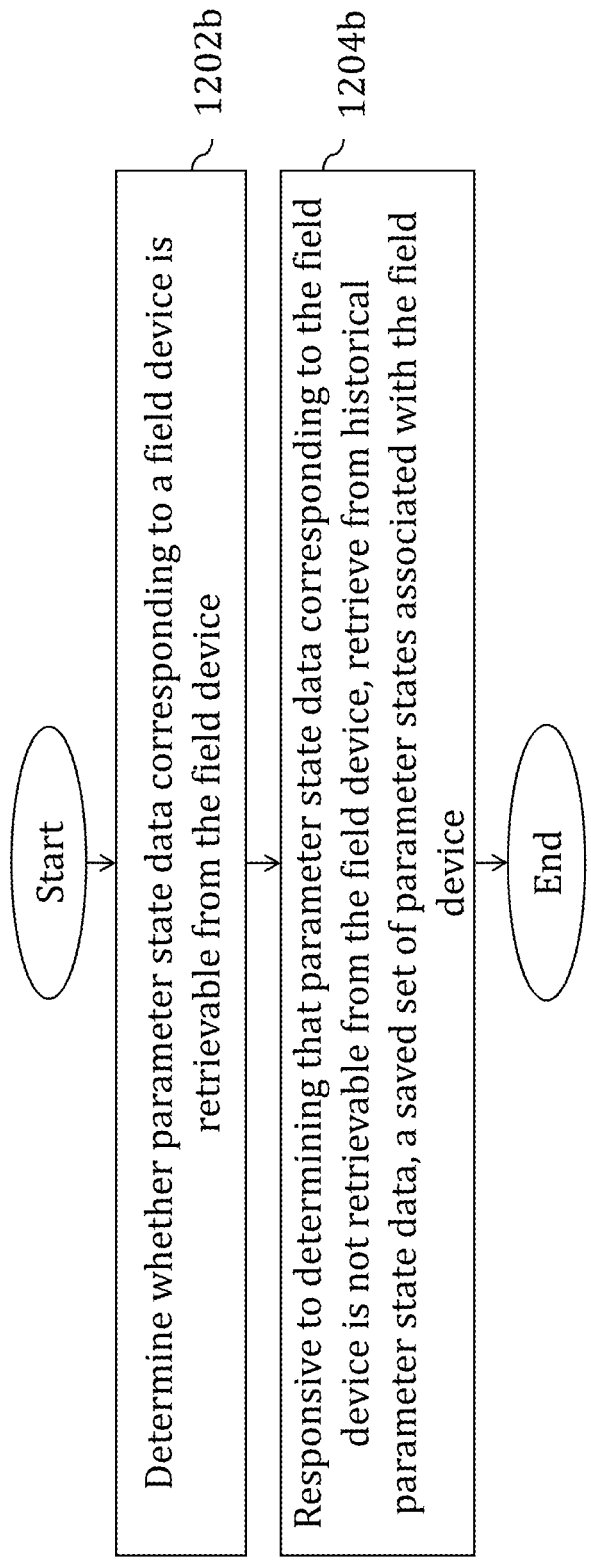

FIGS. 12A and 12B respectively illustrate first and second exemplary method embodiments for retrieving a set of current field device parameter state data, for the purposes of implementing the method of FIG. 10. In an embodiment, either of the methods of FIGS. 12A and 12B are implemented as part of method step 1004 of FIG. 10. The steps of either of FIGS. 12A and 12B may, in an embodiment, be implemented partly or entirely within process control monitoring server 304a, or within a process control management platform or within a distributed control system within process control environment 300.

Step 1202a of FIG. 12A comprises determining whether parameter state data corresponding to a field device is retrievable from the field device. In an embodiment, this may comprise determining whether the field device is communicably coupled with process control monitoring server 304a and/or is responsive to requests for retrieval of parameter state data from a memory of said field device.

Step 1204a comprises responding to determining that parameter state data corresponding to the field device is retrievable from the field device, by retrieving from a memory within the field device, data representing a current set of parameter states associated with the field device.

Likewise, step 1202b of FIG. 12B comprises determining whether parameter state data corresponding to a field device is retrievable from the field device. In an embodiment, this may comprise determining whether the field device is communicably coupled with process control monitoring server 304a and/or is responsive to requests for retrieval of parameter state data from a memory of said field device.

Step 1204b comprises responding to determining that parameter state data corresponding to the field device is not retrievable from the field device, by retrieving from a database or repository of historical parameter state data, saved data corresponding to parameter states associated with the field device. In a particular embodiment of step 1204b, the saved data retrieve at step 1204b comprises a previously saved set of parameter states corresponding to the field device, which have been saved prior to the most recently saved (or currently saved) parameter states corresponding to the field device, and which are retrievable from a historian database.

Figure 14:
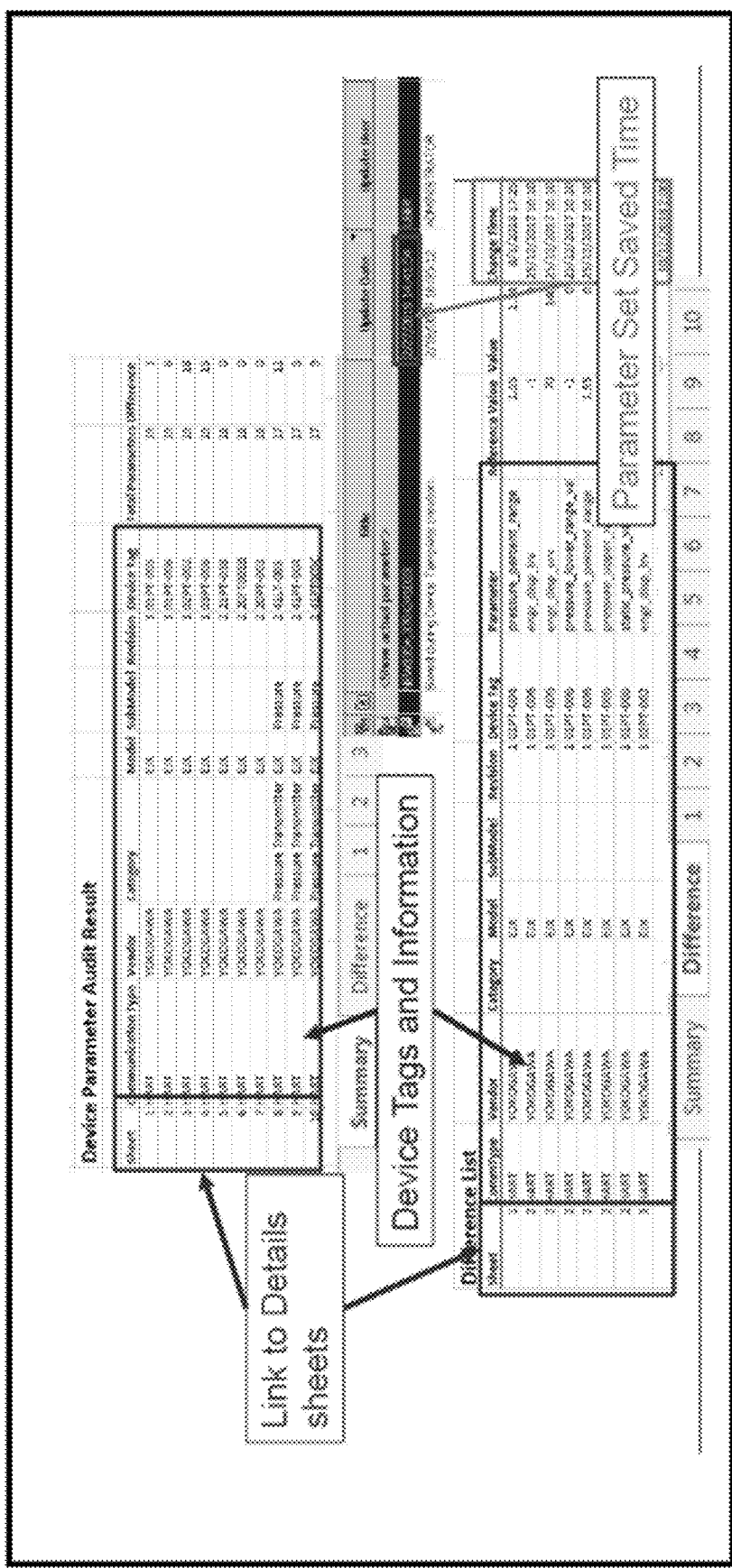

FIGS. 13 and 14 illustrate exemplary interfaces that may be presented to an operator of a process control monitoring server 304a for the purposes of presenting outputs of the method of FIG. 4.

FIG. 13 illustrates a summary report 1300 generated at step 412 of FIG. 4—which summary report shows the number of field devices selected to be monitored/audited, the number of field devices actually monitored/audited, and the quantity of skipped field devices (i.e. field devices which have for any technical reason or error have not been monitored).

FIG. 14 illustrates a report 1400 generated at step 412 of FIG. 4—which report presents, with respect to a field device being monitored/audited, the field device details, how many parameters have been monitored/audited and any differences or deviations between current parameter states of the field device and a reference set of parameter states, or in some other cases, between current parameter states of the field device and a template set of parameter states corresponding to the field device.

Figure 15:
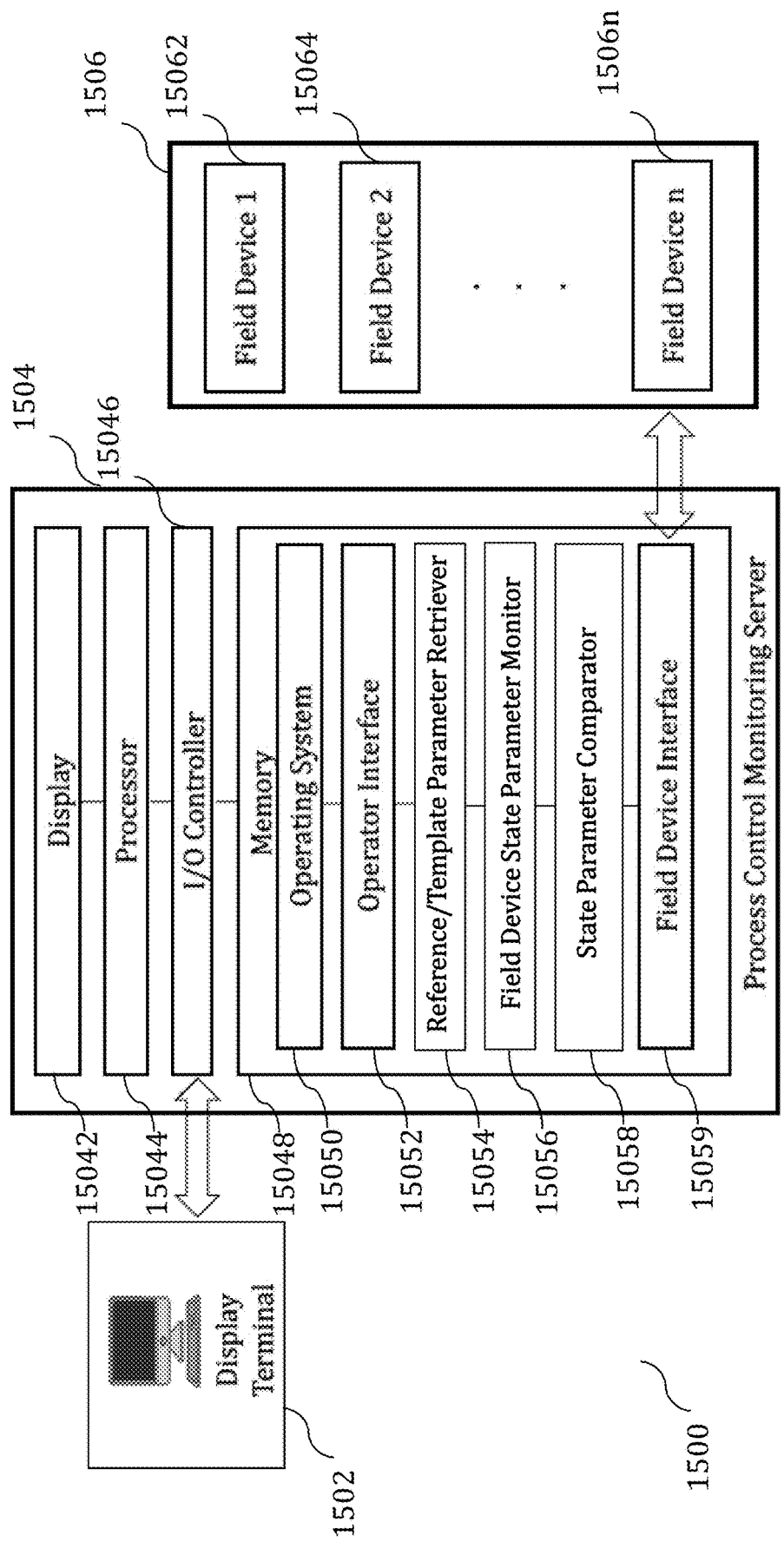
FIG. 15 illustrates a process control environment configured in accordance with the teachings of the present invention.

FIG. 15 illustrates a process control environment 1500 configured in accordance with the teachings of the present invention. Process control environment 1500 comprises operator terminal 1502, process control monitoring server 1504 and field device network 1506.

Operator terminal 1502 comprises any processor implemented terminal device or client device communicably coupled with process control monitoring server 1504, and that is configured to enable an operator to transmit instructions to and receive data from process control monitoring server 1504.

Field device network 1506 comprises a plurality of field devices communicably coupled with process control monitoring server 1504. In FIG. 15, field device network 1506 comprises field device 1 (15062), field device 2 (15064) up to field device n (1506n). Field devices 15062 up to 1506n within field device network 1506 may include any of valve actuators, switches, transmitters, or other sensor devices that may be located within an industrial process environment, and that may be configured for physical or process control functions.

Figure 1:
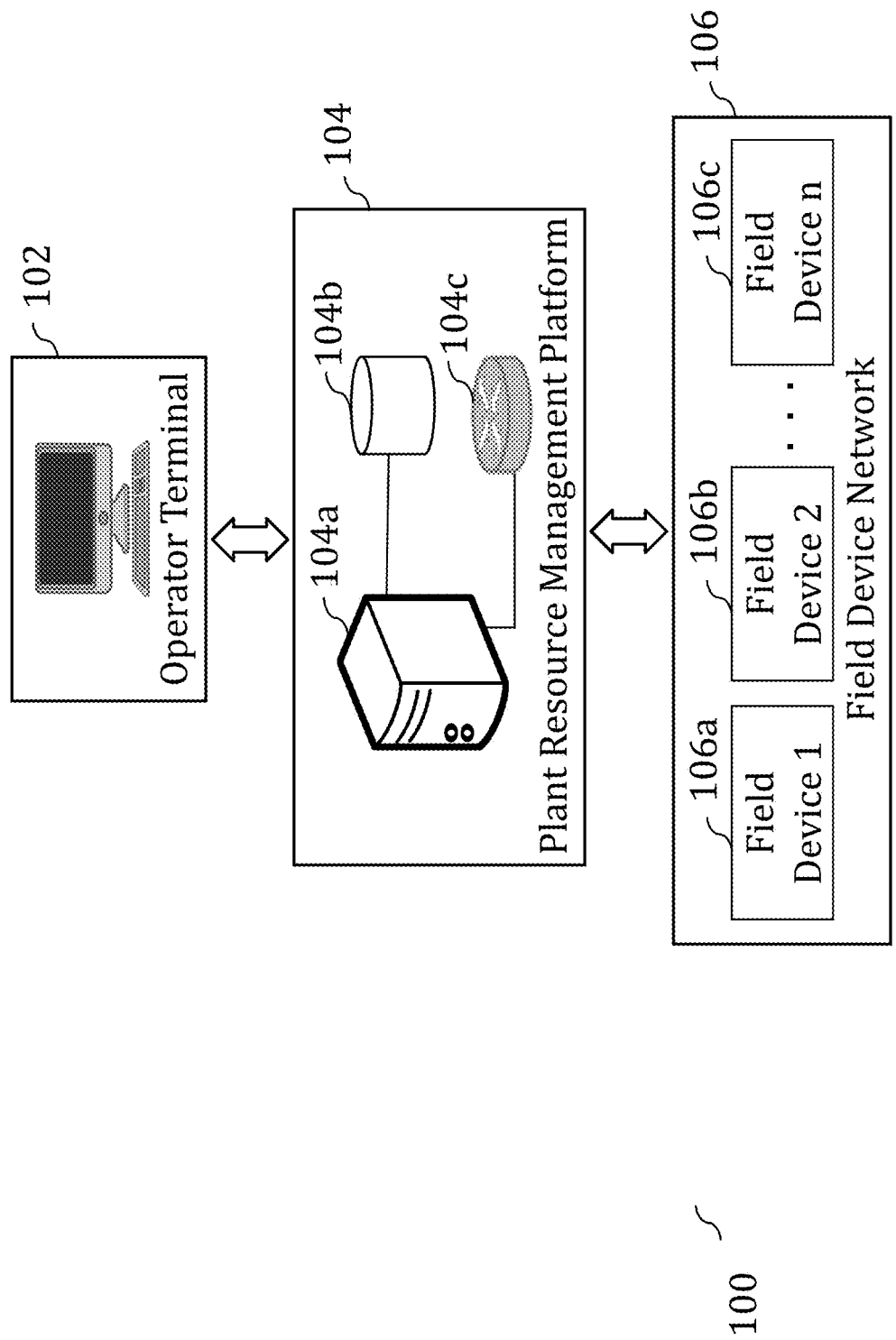
FIG. 1 illustrates a distributed process control system of a type that may be used for process control within an industrial environment.
Figure 2:
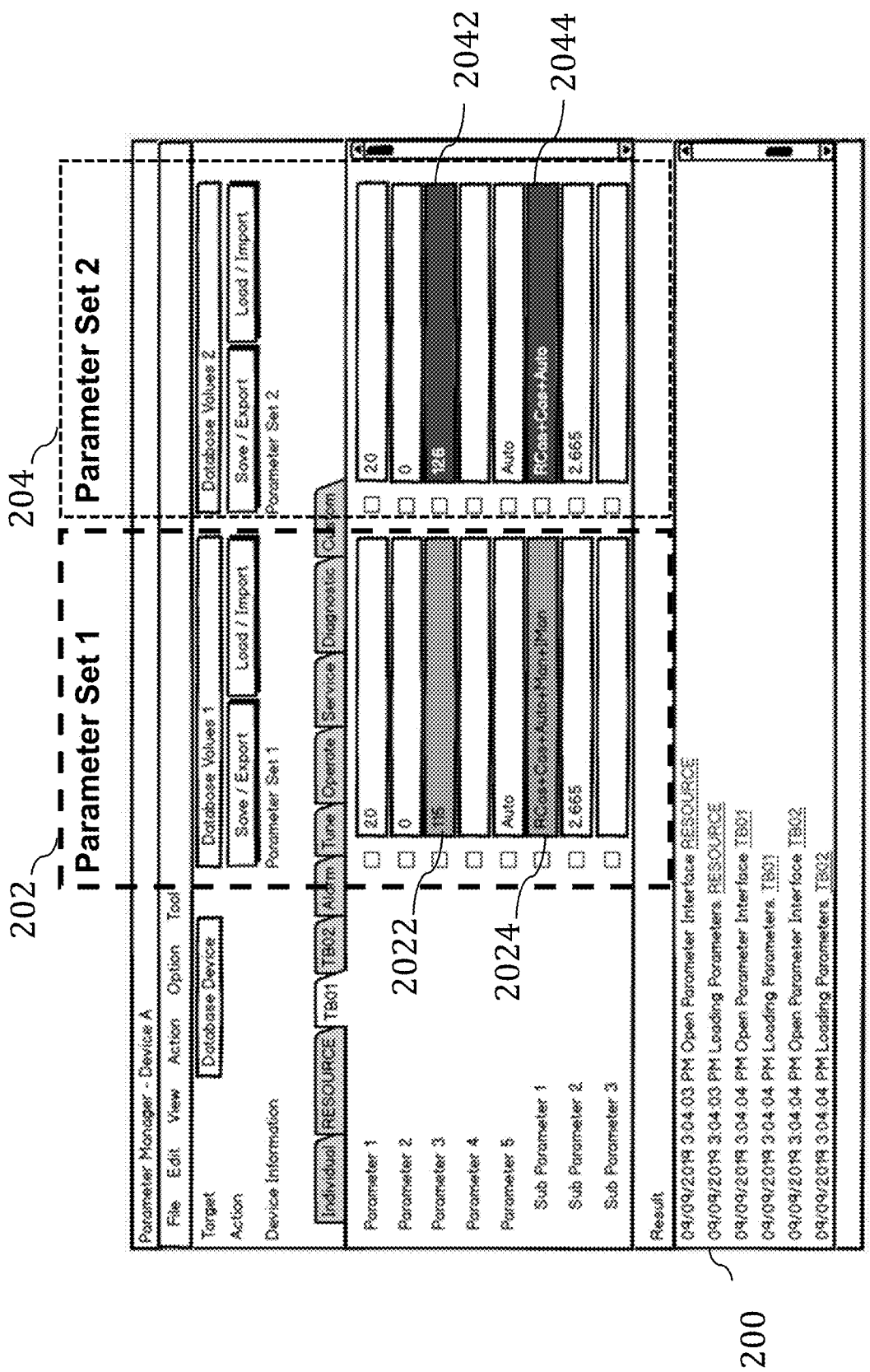
FIG. 2 illustrates a first exemplary screen interface corresponding to a parameter manager tool.

Process control monitoring server 1504 comprises a server implemented as a communication intermediary between operator terminal 1502 and field device network 1506. In an embodiment, process control monitoring server 1504 may be located within a plant resource management platform of a type illustrated in FIG. 1.

Process control monitoring server 1504 may include (i) a display 15042, (ii) a processor 15044 configured for data processing operations within plant resource management server 1504, (iii) an I/O controller 15046 configured to enable input-output functionality associated with plant resource management server 1504, and (iv) a memory 15048, which memory 15048 include transitory memory and/or non-transitory memory.

In an embodiment, memory 15048 may have stored therewith, (i) an operating system 15050 configured for managing device hardware and software resources and that provides common services for software programs implemented within process control monitoring server 1504, (ii) an operator interface 15052 configured to enable an operator to configure or control plant resource management server 1504, (iii) a reference/template parameter retrieval controller 15054 configured to retrieve one or both of reference parameter state data and/or template parameter state data corresponding to one or more field devices, in accordance with method step 1002 of FIG. 10 and/or the method steps of FIG. 11A and/or the method steps of FIG. 11B, (iv) a field device state parameter monitor 15056 configured to communicate with one or more field devices and to retrieve current field device parameter state data corresponding to each such field device from a memory of such field device, in accordance with the teachings of step 1004 of FIG. 10 and/or the method steps of FIG. 12A, (v) a state parameter comparator 15058 configured to compare for one or more field devices, a current set of field device parameter state data against either one of reference parameter state data or template parameter state data corresponding to one or more field devices, in accordance with method step 1006 of FIG. 10, and (vi) a field device interface 15059 configured to enable data communication and control communications between plant resource management server 1504 and field device network 1506 and/or individual field devices 15062 to 1506n therewith.

Figure 16:
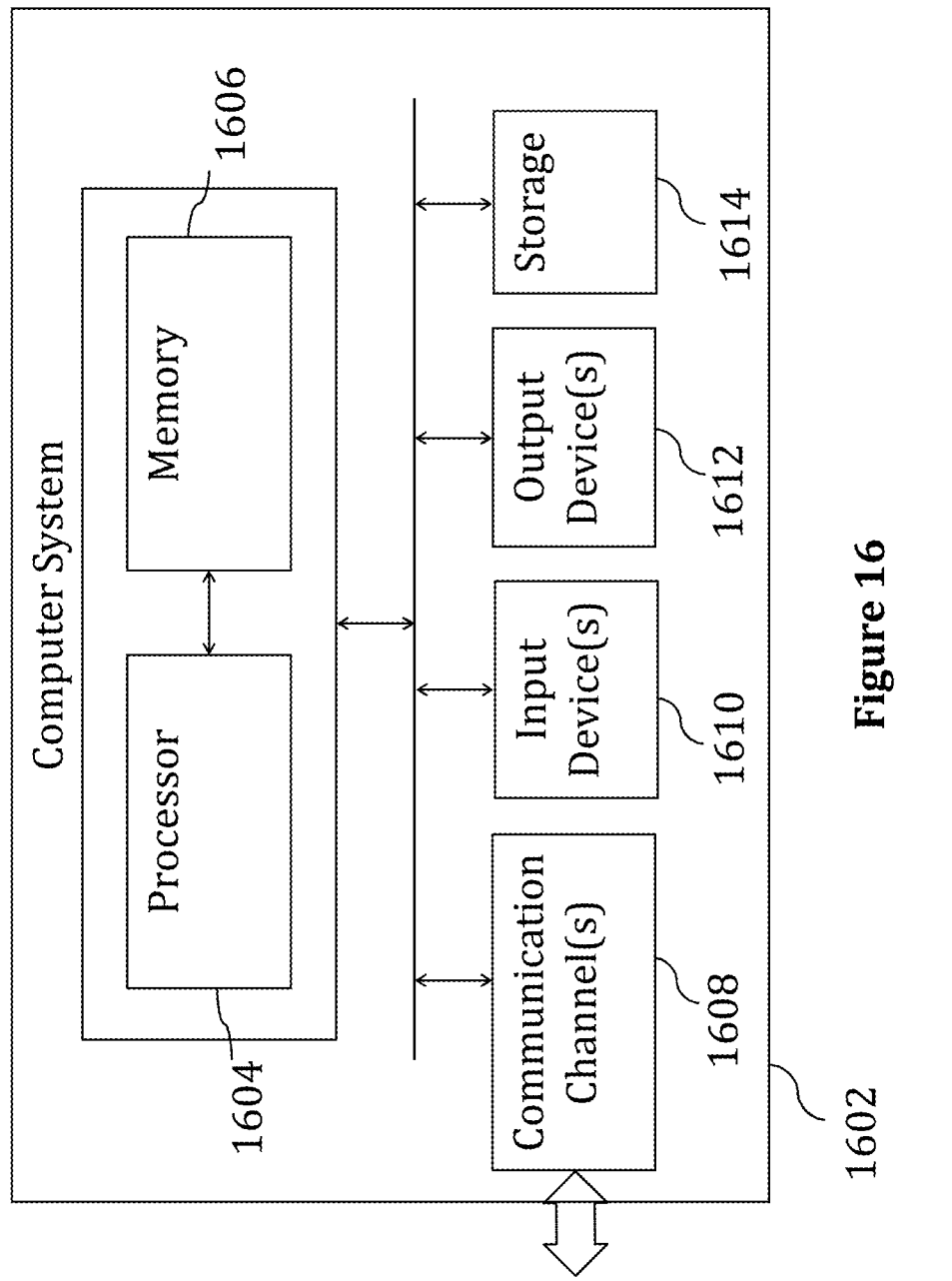
FIG. 16 illustrates an exemplary computer system according to which various embodiments of the present invention may be implemented.

FIG. 16 illustrates an exemplary computer system according to which various embodiments of the present invention may be implemented.

System 1600 includes computer system 1602 which in turn comprises one or more processors 1604 and at least one memory 1606. Processor 1604 is configured to execute program instructions—and may be a real processor or a virtual processor. It will be understood that computer system 1602 does not suggest any limitation as to scope of use or functionality of described embodiments. The computer system 1602 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1602 in accordance with the present invention may include one or more servers, desktops, laptops, tablets, smart phones, mobile phones, mobile communication devices, tablets, phablets and personal digital assistants. In an embodiment of the present invention, the memory 1606 may store software for implementing various embodiments of the present invention. The computer system 1602 may have additional components. For example, the computer system 1602 may include one or more communication channels 1608, one or more input devices 1610, one or more output devices 1612, and storage 1614. An interconnection mechanism (not shown) such as a bus, controller, or network, interconnects the components of the computer system 1602. In various embodiments of the present invention, operating system software (not shown) provides an operating environment for various software executing in the computer system 1602 using a processor 1604, and manages different functionalities of the components of the computer system 1602.

The communication channel(s) 1608 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1610 may include, but is not limited to, a touch screen, a keyboard, mouse, pen, joystick, trackball, a voice device, a scanning device, or any another device that is capable of providing input to the computer system 1602. In an embodiment of the present invention, the input device(s) 1610 may be a sound card or similar device that accepts audio input in analog or digital form. The output device(s) 1612 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1602.

The storage 1614 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1602. In various embodiments of the present invention, the storage 1614 may contain program instructions for implementing any of the described embodiments.

In an embodiment of the present invention, the computer system 1602 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1602. The method described herein is typically implemented as a computer program product, comprising a set of program instructions that is executed by the computer system 1602 or any other similar device. The set of program instructions may be a series of computer readable codes stored on a tangible medium, such as a computer readable storage medium (storage 1614), for example, diskette, CD-ROM, ROM, flash drives or hard disk, or transmittable to the computer system 1602, via a modem or other interface device, over either a tangible medium, including but not limited to optical or analogue communications channel(s) 1608. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages that were unavailable in prior art solutions. In particular, the invention:

enables monitoring and validation of field device parameter states, in an automated manner for batches of devices—to enable simultaneous monitoring and validation of a large number of field device parameter states in connection with/association with a large number of field devices, enables automated report generation—wherein detected deviations or differences between two sets of parameter state data can be comprehensively listed, and the report can be conveniently filtered, viewed and/or otherwise modified by a user/operator, enables a user/operator to modify values parameter data states within a field device, in response to detecting deviations between current parameter data states and one or more reference parameter data states for that field device, enables comparisons between field device parameter data states and predefined parameter data state templates that have been created with settings for various usages or purposes of one or more field devices, enables configuration of report generation to limit the number of field device parameter data states under consideration, based on one or more meaningful parameters (for example, based on whether the data parameters are configurable parameters).

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for monitoring field device parameter state changes within a process control system comprising a plurality of field devices, the method comprising:
for each field device within a selected sub-set of the plurality of field devices,
retrieving a first set of field device parameter state data associated with the field device, wherein the first set of field device parameter state data represents either (i) reference parameter states associated with the field device, or (ii) a stored set of prior parameter states associated with the field device, and which prior parameter states are distinct from a current set of parameter states associated with the field device;
obtaining a second set of field device parameter state data associated with the field device, wherein the second set of field device parameter state data represents a current set of parameter states associated with the field device, wherein obtaining the second set of field device parameter state data includes:
querying the field device to determine whether a memory of the field device is accessible;
retrieving the second set of field device parameter state data from the memory of the field device when the memory of the field device is accessible; and
retrieving the second set of field device parameter state data from a historical database that is separate from the memory of the field device when the memory of the field device is not accessible, the historical database including field device parameter state data previously collected for the field device;
comparing the first set of field device parameter state data and the second set of field device parameter state data respectively corresponding to the field device;
detecting deviations between the compared first set of field device parameter state data and second set of field device parameter state data; and
displaying on a display device, for each field device within the selected sub-set of the plurality of field devices, data representing the detected deviations between the first set of field device parameter state data and the second set of field device parameter state data.

2. The method as claimed in claim 1, wherein the sub-set of the plurality of field devices comprises two or more field devices within the process control system.

3. The method as claimed in claim 1, wherein the field device parameter state data previously collected for the field device is collected at a first point in time.

4. The method as claimed in claim 3, wherein the second set of field device parameter state data retrieved from the memory of the field device is collected at a second point in time that is more recent than the first point in time.

5. The method as claimed in claim 1, wherein:
the first set of field device parameter state data represents parameter state data that has been received from the field device prior to the second set of field device parameter state data.

6. The method as claimed in claim 1, wherein field device parameters to which the first set of field device parameter state data and second set of field device parameter state data correspond, are selected based on a received user input, wherein the user input is received through a user interface.

7. The method as claimed in claim 6, wherein the field device parameters to which the first set of field device parameter state data and second set of field device parameter state data correspond, consist only of field device parameters having one or more attributes that are user configurable through the user interface.

8. The method as claimed in claim 6, wherein:
responsive to the received user input comprising a first user input, the field device parameters to which the first set of field device parameter state data and second set of field device parameter state data correspond comprise only such field device parameters that are shared by all selected field devices belonging to the same class of field devices to which the selected field devices correspond; or
responsive to the received user input comprising a second user input, the field device parameters to which the first set of field device parameter state data and second set of field device parameter state data correspond, are field device parameters associated with the field device.

9. The method as claimed in claim 8, wherein:
the received user input is the first user input;
the first set of field device parameter state data comprises stored reference parameter state data associated with a plurality of field devices within an identified class of field devices to which the field device corresponds; and
the stored reference parameter state data is used as a first set of field device parameter state data for two or more field devices within the selected sub-set of the plurality of field devices, wherein the two or more field devices correspond to the identified class of field devices.

10. The method as claimed in claim 8, wherein:
the received user input is the second user input; and
the first set of field device parameter state data comprises stored reference parameter state data associated uniquely with the field device.

11. The method as claimed in claim 10, wherein responsive to detection of a deviation between the compared first set of field device parameter state data and second set of field device parameter state data, the stored reference parameter state data associated uniquely with the field device is updated based on an update instruction received through user input.

12. The method as claimed in claim 1, wherein an alert is generated responsive to detection of a deviation between the compared first set of field device parameter state data and second set of field device parameter state data, wherein alert generation is based on one or more predefined alert generation rules.

13. A system for monitoring field device parameter state changes within a process control system, the system comprising:
a plurality of field devices; and
a monitoring server configured:
for each field device within a selected sub-set of the plurality of field devices, to:
retrieve a first set of field device parameter state data associated with the field device, wherein the first set of field device parameter state data represents either (i) reference parameter states associated with the field device, or (ii) a stored set of prior parameter states associated with the field device, and which prior parameter states are distinct from a current set of parameter states associated with the field device;
obtain a second set of field device parameter state data associated with the field device, wherein the second set of field device parameter state data represents a current set of parameter states associated with the field device, wherein obtaining the second set of field device parameter state data includes:
query the field device to determine whether a memory of the field device is accessible;
retrieving the second set of field device parameter state data from the memory of the field device when the memory of the field device is accessible; and
retrieving the second set of field device parameter state data from a historical database that is separate from the memory of the field device when the memory of the field device is not accessible, the historical database including field device parameter state data previously collected for the field device;
compare the first set of field device parameter state data and the second set of field device parameter state data respectively corresponding to the field device;
detect deviations between the compared first set of field device parameter state data and second set of field device parameter state data; and
render to a display device, for each field device within the selected sub-set of the plurality of field devices, data representing the detected deviations between the first set of field device parameter state data and the second set of field device parameter state data.

14. The system as claimed in claim 13, wherein the sub-set of the plurality of field devices comprises two or more field devices within the process control system.

15. The system as claimed in claim 13, wherein the field device parameter state data previously collected for the field device is collected at a first point in time.

16. The system as claimed in claim 15, wherein the second set of field device parameter state data retrieved from the memory of the field device is collected at a second point in time that is more recent than the first point in time.

17. The system as claimed in claim 13, wherein:
the first set of field device parameter state data represents parameter state data that has been received from the field device prior to the second set of field device parameter state data.

18. The system as claimed in claim 13, wherein field device parameters to which the first set of field device parameter state data and second set of field device parameter state data correspond, are selected based on a received user input, wherein the user input is received through a user interface.

19. The system as claimed in claim 18, wherein the field device parameters to which the first set of field device parameter state data and second set of field device parameter state data correspond consist only of field device parameters having one or more attributes that are user configurable through the user interface.

20. The system as claimed in claim 18, wherein:
responsive to the received user input comprising a first user input, the field device parameters to which the first set of field device parameter state data and second set of field device parameter state data correspond comprise only such field device parameters that are shared by all selected field devices belonging to the same class of field devices to which the selected field devices correspond; or
responsive to the received user input comprising a second user input, the field device parameters to which the first set of field device parameter state data and second set of field device parameter state data correspond, are field device parameters associated with the field device.

21. The system as claimed in claim 20, wherein:
the received user input is the first user input;
the first set of field device parameter state data comprises stored reference parameter state data associated with a plurality of field devices within an identified class of field devices to which the field device corresponds; and
the stored reference parameter state data is used as a first set of field device parameter state data for two or more field devices within the selected sub-set of the plurality of field devices, wherein the two or more field devices correspond to the identified class of field devices.

22. The system as claimed in claim 20, wherein:
the received user input is the second user input; and
the first set of field device parameter state data comprises stored reference parameter state data associated uniquely with the field device.

23. The system as claimed in claim 22, wherein the monitoring server is configured such that, responsive to detection of a deviation between the compared first set of field device parameter state data and second set of field device parameter state data, the stored reference parameter state data associated uniquely with the field device is updated based on an update instruction received through user input.

24. The system as claimed in claim 13, wherein the monitoring server is configured to generate an alert responsive to detection of a deviation between the compared first set of field device parameter state data and second set of field device parameter state data, wherein alert generation is based on one or more predefined alert generation rules.

25. A computer program product for monitoring field device parameter state changes within a process control system comprising a plurality of field devices, the computer program product comprising a non-transitory computer usable medium having a computer readable program code embodied therein, the computer readable program code comprising instructions for implementing within a processor based computing system, the steps of:

for each field device within a selected sub-set of the plurality of field devices,
retrieving a first set of field device parameter state data associated with the field device, wherein the first set of field device parameter state data represents either (i) reference parameter states associated with the field device, or (ii) a stored set of prior parameter states associated with the field device, and which prior parameter states are distinct from a current set of parameter states associated with the field device;
obtaining a second set of field device parameter state data associated with the field device, wherein the second set of field device parameter state data represents a current set of parameter states associated with the field device, wherein obtaining the second set of field device parameter state data includes:
  querying the field device to determine whether a memory of the field device is accessible;
  retrieving the second set of field device parameter state data from the memory of the field device when the memory of the field device is accessible; and
  retrieving the second set of field device parameter state data from a historical database that is separate from the memory of the field device when the memory of the field device is not accessible, the historical database including field device parameter state data previously collected for the field device;
comparing the first set of field device parameter state data and the second set of field device parameter state data respectively corresponding to the field device; and
detecting deviations between the compared first set of field device parameter state data and second set of field device parameter state data; and
rendering to a display device, for each field device within the selected sub-set of the plurality of field devices, data representing the detected deviations between the first set of field device parameter state data and the second set of field device parameter state data.

* * * * *